US009664937B2

(12) United States Patent
Lee et al.

(10) Patent No.: US 9,664,937 B2
(45) Date of Patent: May 30, 2017

(54) NANO CRYSTAL DISPLAY DEVICE HAVING PATTERNED MICROCAVITY STRUCTURE

(71) Applicant: Samsung Display Co., Ltd., Yongin, Gyeonggi-Do (KR)

(72) Inventors: Hee-Keun Lee, Suwon-si (KR); Jung Wook Lee, Uiwang-si (KR); Yeun Tae Kim, Suwon-si (KR); Hae Ju Yun, Hwaseong-si (KR)

(73) Assignee: Samsung Display Co., LTD. (KR)

( * ) Notice: Subject to any disclaimer, the term of this patent is extended or adjusted under 35 U.S.C. 154(b) by 187 days.

(21) Appl. No.: 13/962,842

(22) Filed: Aug. 8, 2013

(65) Prior Publication Data

US 2014/0198286 A1 Jul. 17, 2014

(30) Foreign Application Priority Data

Jan. 16, 2013 (KR) ........................ 10-2013-0004996

(51) Int. Cl.
*G02F 1/1339* (2006.01)
*G02F 1/1333* (2006.01)
*G02F 1/1362* (2006.01)

(52) U.S. Cl.
CPC .. *G02F 1/133377* (2013.01); *G02F 1/136209* (2013.01)

(58) Field of Classification Search
CPC ............ G02F 1/133512; G02F 1/1333; G02F 1/133377; G02F 1/136209
USPC .................................. 349/110–111, 155–157
See application file for complete search history.

(56) References Cited

U.S. PATENT DOCUMENTS

| 6,122,025 A * | 9/2000 | Kim .................. G02F 1/136227 349/110 |
| 6,141,072 A | 10/2000 | Drabik et al. |
| 6,169,592 B1 | 1/2001 | Choi |
| 6,330,048 B1 | 12/2001 | Shiomi et al. |
| 6,400,430 B2 | 6/2002 | Nakao et al. |
| 6,912,038 B2 | 6/2005 | Liao et al. |

(Continued)

FOREIGN PATENT DOCUMENTS

| JP | 2003-330130 A | 11/2003 |
| JP | 2008-033117 A | 2/2008 |

(Continued)

*Primary Examiner* — Charles Chang
(74) *Attorney, Agent, or Firm* — Innovation Counsel LLP

(57) ABSTRACT

A display panel with microcavities each having ends of asymmetric cross-sectional area. An exemplary display panel has a substrate; a pixel electrode formed on the substrate; a first black matrix and a second black matrix each disposed on the substrate; and a supporting member disposed on the substrate over the pixel electrode and the black matrix, the supporting member shaped so as to form a microcavity between the pixel electrode and the supporting member, the microcavity having an upper surface proximate to the supporting member and a lower surface opposite the upper surface. The microcavity has one end positioned over the first black matrix, and another end opposite the first end and positioned over the second black matrix; the lower surface of the microcavity has first and second channels disposed therein, the first channel positioned over the first black matrix, and the second channel positioned over the second black matrix.

11 Claims, 31 Drawing Sheets

(56) References Cited

U.S. PATENT DOCUMENTS

| | | |
|---|---|---|
| 7,123,319 B2 | 10/2006 | Broer et al. |
| 7,974,000 B2 | 7/2011 | Cho |
| 2006/0146267 A1 | 7/2006 | Choi et al. |
| 2007/0069204 A1* | 3/2007 | Jang .................... G02F 1/13394 257/40 |
| 2012/0062448 A1 | 3/2012 | Kim et al. |
| 2012/0105759 A1* | 5/2012 | Park .................... G02F 1/13394 349/43 |
| 2013/0093985 A1* | 4/2013 | Kang ................ G02F 1/133377 349/106 |
| 2014/0055721 A1 | 2/2014 | Choi et al. |

FOREIGN PATENT DOCUMENTS

| | | |
|---|---|---|
| JP | 2008-242031 A | 10/2008 |
| KR | 10-2003-0063656 A | 7/2003 |
| KR | 10-2004-0085583 A | 10/2004 |
| KR | 10-2006-0091420 A | 8/2006 |
| KR | 10-0688958 | 2/2007 |
| KR | 10-2007-0030375 A | 3/2007 |
| KR | 10-2007-0108910 A | 11/2007 |
| KR | 10-2008-0049193 A | 6/2008 |
| KR | 10-2012-0026880 A | 3/2012 |
| KR | 10-2012-0044778 A | 5/2012 |
| KR | 10-2012-0056669 A | 6/2012 |
| KR | 10-2013-0134153 A | 12/2013 |
| KR | 10-2013-0140325 A | 12/2013 |
| KR | 10-2014-0025739 A | 3/2014 |
| KR | 10-2014-0048731 A | 4/2014 |
| KR | 10-2014-0085583 A | 10/2014 |

\* cited by examiner

NANO CRYSTAL DISPLAY DEVICE HAVING PATTERNED MICROCAVITY STRUCTURE

CROSS-REFERENCE TO RELATED APPLICATION

This application claims priority to, and the benefit of, Korean Patent Application No. 10-2013-0004996 filed in the Korean Intellectual Property Office on Jan. 16, 2013, the entire contents of which are incorporated herein by reference.

BACKGROUND OF THE INVENTION (a) Field of the Invention

Embodiments of the present invention relate generally to flat panel displays and their manufacture. More specifically, embodiments of the present invention relate to displays with patterned microcavity structures.

(b) Description of the Related Art

A liquid crystal display is one type of flat panel display devices that has found wide acceptance, and commonly includes two display panels where field generating electrodes such as pixel electrodes and a common electrode are formed, with a liquid crystal layer interposed therebetween. The liquid crystal display generates an electric field in the liquid crystal layer by applying voltages to the field generating electrodes, thus inducing specific orientations of liquid crystal molecules of the liquid crystal layer and thusly controlling the polarization of incident light, thereby displaying an image.

Liquid crystal displays can have a NCD (Nano Crystal Display) structure that employs a sacrificial layer formed of an organic material. A supporting member is coated thereon, then the sacrificial layer is removed, and a liquid crystal is filled in the empty space formed by removal of the sacrificial layer.

A method of manufacturing liquid crystal displays having a NCD structure also includes a process of injecting and drying an aligning agent before injecting the liquid crystal to arrange and align the liquid crystal molecules. In the process of drying the aligning agent, evaporation of the aligning agent may result in deposits of aligning agent solids such that light leakage or transmittance deterioration may be generated.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention provides a liquid crystal display minimizing an agglomeration of a solid, and a manufacturing method thereof.

In one embodiment, a display panel comprises a substrate; a pixel electrode formed on the substrate; a first black matrix and a second black matrix each disposed on the substrate; and a supporting member disposed on the substrate over the pixel electrode and the black matrix. The supporting member is shaped so as to form a microcavity between the pixel electrode and the supporting member, the microcavity having an upper surface proximate to the supporting member and a lower surface opposite to the upper surface. The microcavity has a first end positioned over the first black matrix, and a second end opposite the first end and positioned over the second black matrix. Also, the lower surface of the microcavity has first and second channels disposed therein, the first channel positioned over the first black matrix, and the second channel positioned over the second black matrix.

The first channel can be positioned proximate to the first end, and the second channel can be positioned proximate to the second end.

The microcavity can extend lengthwise along a major axis, and have a minor axis oriented perpendicular to the major axis. The first black matrix and the second black matrix can each be oriented parallel to the major or the minor axis.

Widths of each of the first and second depressions can each be less than or equal to a height of the microcavity.

The pixel electrode can be a first pixel electrode, the microcavity can be a first microcavity, and the supporting member can be a first supporting member. The first microcavity can be disposed between the first pixel electrode and the first supporting member. The display panel can further comprise: a second pixel electrode disposed on the substrate proximate to the first pixel electrode; a second supporting member disposed on the substrate over the second pixel electrode; a second microcavity disposed between the second pixel electrode and the second supporting member, the second microcavity having a top surface proximate to the second supporting member and a bottom surface opposite to the top surface; and a third black matrix and a fourth black matrix each disposed on the substrate and under the second microcavity. The second microcavity can have a one end positioned over the third black matrix, and another end opposite the one end and positioned over the fourth black matrix. The bottom surface of the second microcavity can have third and fourth channels disposed therein, the third channel positioned over the third black matrix, and the fourth channel positioned over the fourth black matrix.

In another embodiment, a display panel can comprise a substrate; a pixel electrode disposed on the substrate; a black matrix disposed on the substrate; and a supporting member disposed on the substrate over the pixel electrode and the black matrix. The supporting member can be shaped so as to form a microcavity between the pixel electrode and the supporting member. The microcavity can have an upper surface proximate to the supporting member, a lower surface opposite to the upper surface, a first side surface extending between the upper and lower surfaces, and a second side surface opposite to the first side surface and extending between the upper and lower surfaces. At least one of the first and second side surfaces can have a plurality of depressions patterned therein.

The plurality of depressions can comprise a repeating pattern of depressions extending along a length of its respective side surface, each depression extending from the lower surface to the upper surface.

Each of the depressions can have an at least approximately triangular cross-sectional profile, an at least approximately U-shaped profile, an at least approximately trapezoidal cross-sectional profile, an at least approximately square cross-sectional profile, and/or an at least approximately sawtooth profile.

The depressions can each have a pitch of approximately 3 μm or less. Alternatively, the depressions can each have a pitch of approximately 1.8 μm.

Each of the depressions can be positioned over the black matrix.

The pixel electrode can be a first pixel electrode, the microcavity can be a first microcavity, the black matrix can be a first black matrix, and the supporting member can be a first supporting member. The first microcavity can be disposed between the first pixel electrode and the first supporting member. The display panel can further comprise: a second pixel electrode disposed on the substrate proximate to the first pixel electrode; a second supporting member disposed on the substrate over the second pixel electrode; a second microcavity disposed between the second pixel electrode and the second supporting member, the second microcavity having a top surface proximate to the second supporting member, a bottom surface opposite to the top surface, a third side surface extending between the top and bottom surfaces, and a fourth side surface opposite to the third side surface and extending between the top and bottom surfaces; and a second black matrix disposed on the substrate and under the second microcavity. The third and fourth side surfaces can each have a plurality of depressions patterned therein.

In a further embodiment, a method of manufacturing a display panel can comprise: forming a pixel electrode on a substrate; forming a black matrix on the substrate; and forming a supporting member on the substrate over the pixel electrode and the black matrix. The supporting member can be shaped so as to form a microcavity between the pixel electrode and the supporting member. The method can also include forming a feature proximate to at least one end of the microcavity, the feature positioned over the black matrix and configured to accumulate an aligning agent therein once the aligning agent is injected into the microcavity.

The forming a black matrix can further comprise forming a first black matrix and a second black matrix on the substrate. The microcavity can have an upper surface proximate to the supporting member and a lower surface opposite to the upper surface. The microcavity can have a first end positioned over the first black matrix, and a second end opposite the first end and positioned over the second black matrix. The forming a feature can further comprise forming at least one channel in the lower surface of the microcavity, the at least one channel positioned over at least one of the first black matrix and the second black matrix.

The forming at least one channel can further comprise forming first and second channels in the lower surface of the microcavity, the first channel positioned over the first black matrix, and the second channel positioned over the second black matrix.

The microcavity can have an upper surface proximate to the supporting member, a lower surface opposite to the upper surface, and at least one side surface extending between the upper and lower surfaces; and the method can further comprise patterning a plurality of depressions upon the at least one side surface.

The plurality of depressions can comprise a repeating pattern of depressions extending along a length of its respective side surface, each depression extending from the lower surface to the upper surface.

As described, according to an exemplary embodiment of the present invention, a trench is formed at an edge of a microcavity or a shape of the edge of the microcavity is patterned to have a non-linear shaped profile. Accordingly, a solid of an aligning agent is gathered at the trench or the non-linear shape, thereby minimizing light leakage or transmittance deterioration.

DETAILED DESCRIPTION OF THE EMBODIMENTS

Figure 1:
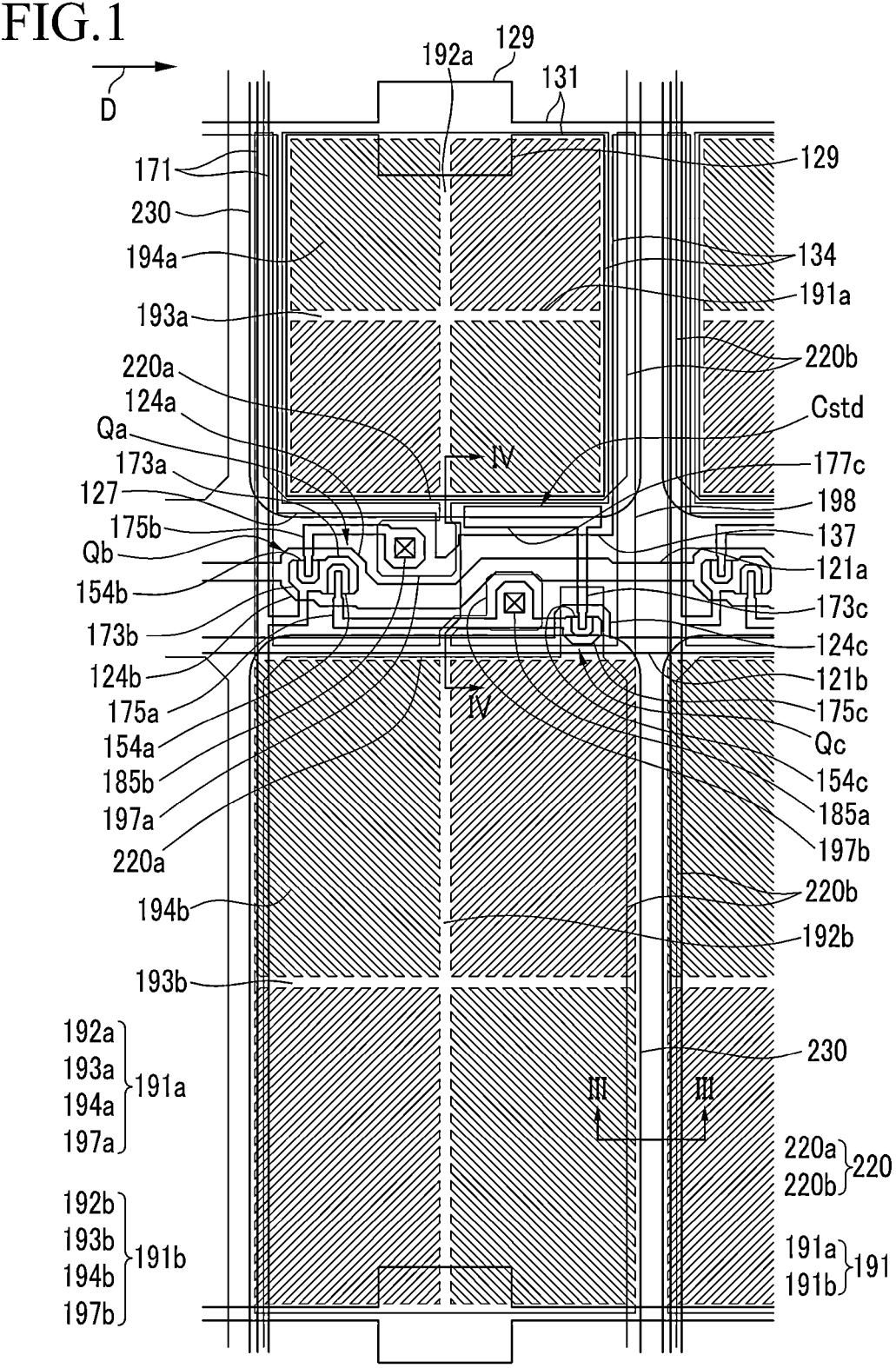
FIG. 1 is a top plan view of a liquid crystal display according to an exemplary embodiment of the present invention.

The present invention will be described more fully hereinafter with reference to the accompanying drawings, in which exemplary embodiments of the invention are shown. However, the present invention is not limited to the exemplary embodiments described herein, and may be embodied in other forms. Rather, exemplary embodiments described herein are provided to thoroughly and completely explain the disclosed contents and to sufficiently transfer the ideas of the present invention to a person of ordinary skill in the art.

In the drawings, the thicknesses of layers and regions, as well as other dimensions, are exaggerated for clarity. It is to be noted that when a layer is referred to as being "on" another layer or substrate, it can be directly formed on the other layer or substrate or can be formed on the other layer or substrate with a third layer interposed therebetween. Like constituent elements are denoted by like reference numerals throughout the specification.

Embodiments of the invention relate to a display such as a liquid crystal display, where the display panel has a single substrate that holds both the pixel electrodes and common electrode, as well as a liquid crystal layer injected therebetween. The liquid crystal is held in a number of microcavities, each of which has openings for injection of the liquid crystal. The microcavities have trenches formed in their bottom surfaces, where the trenches are located over a black matrix. In this manner, solid residue from aligning agent injected into the microcavities accumulates in the trenches. As the trenches are positioned over a light-blocking layer, the accumulated solid residue is collected in an area that is not visible to the viewer, thus preventing any deleterious visual effects. Alternative configurations include patterns etched into side walls of the microcavities and positioned over a black matrix, rather than (or in addition to) trenches, where these side wall patterns also act to collect aligning agent solids thereon.

Figure 2:
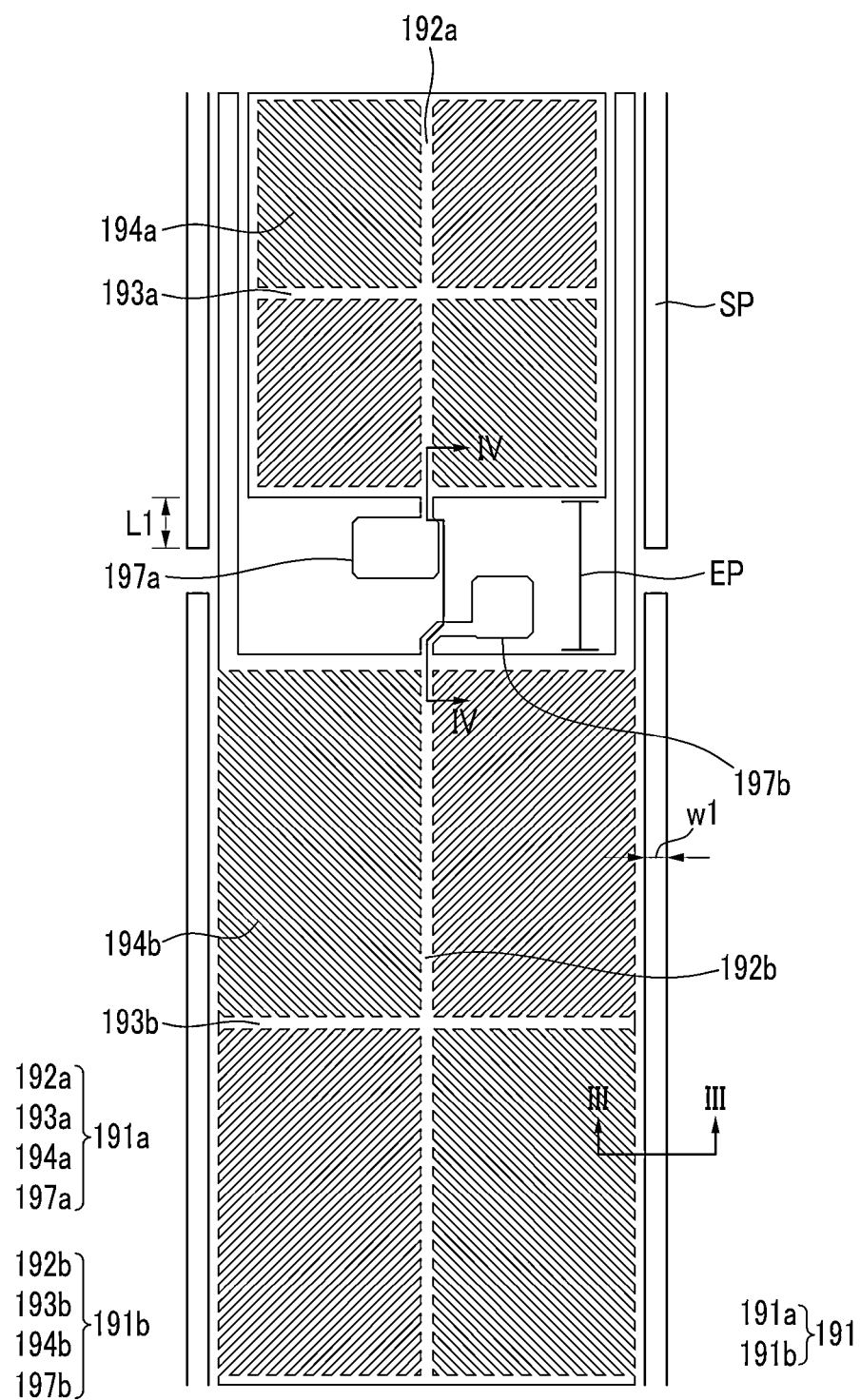
FIG. 2 is a top plan view schematically explaining an arrangement of a trench according to an exemplary embodiment of the present invention of FIG. 1.
Figure 3:
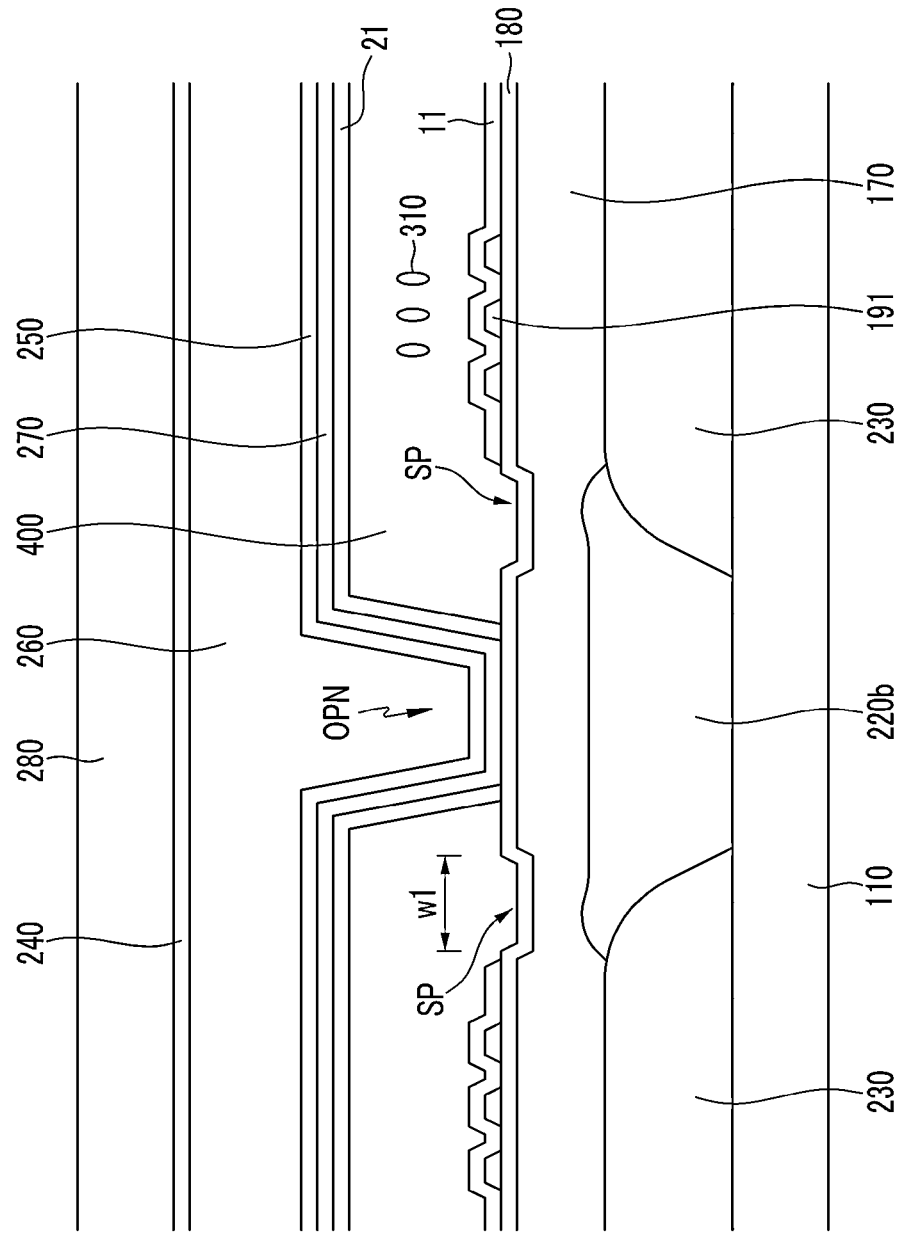
FIG. 3 is a cross-sectional view taken along a line III-III of FIG. 1.
Figure 4:
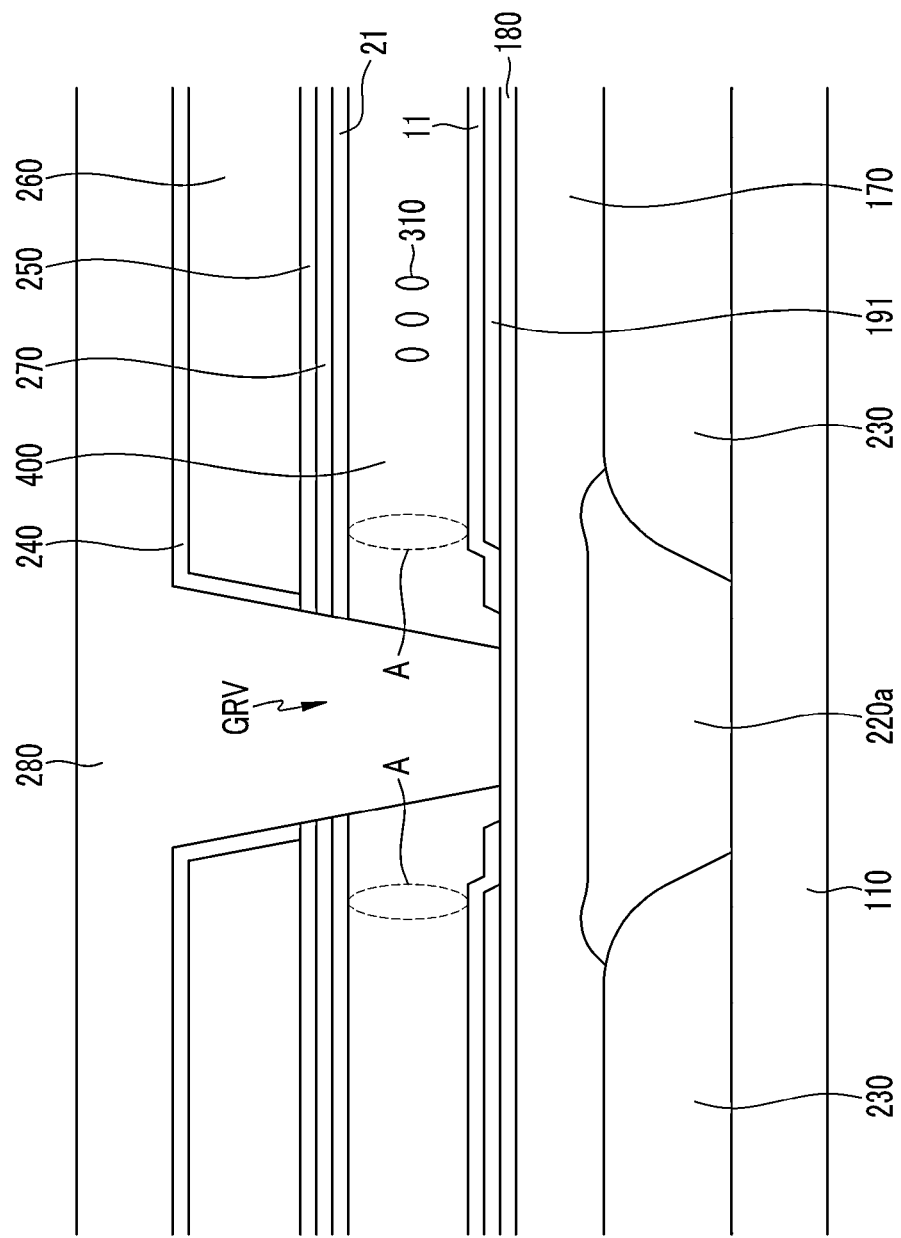
FIG. 4 is a cross-sectional view taken along a line IV-IV of FIG. 1.
Figure 5:
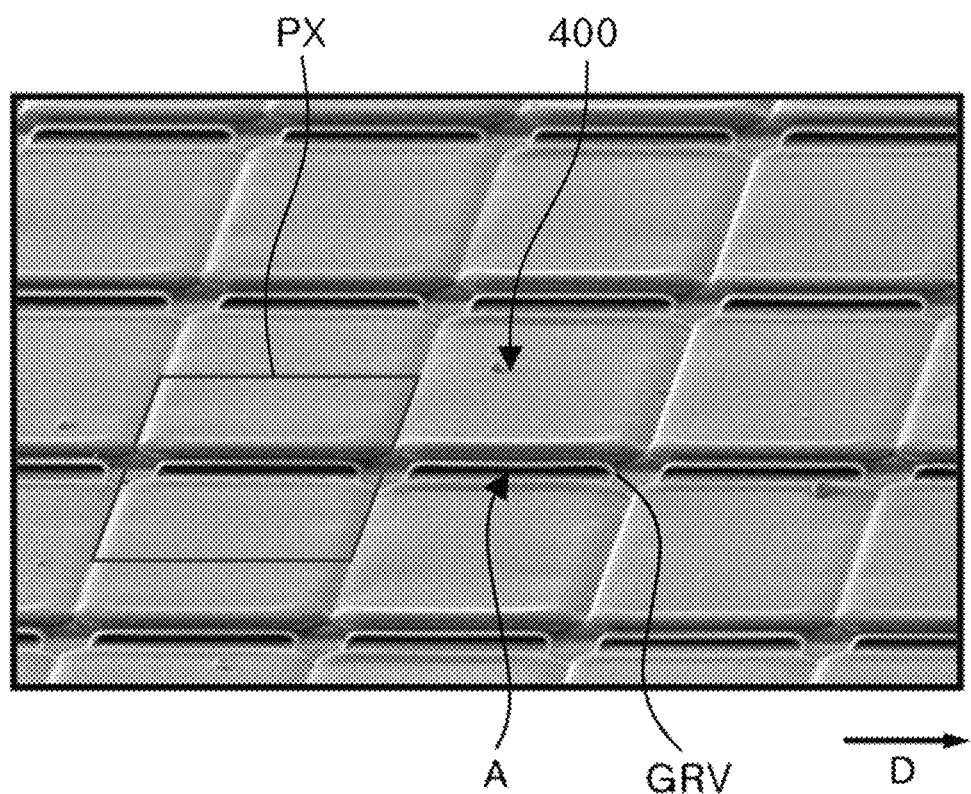
FIG. 5 is a perspective view of a microcavity according to an exemplary embodiment of the present invention.

FIG. 1 is a top plan view of a liquid crystal display according to an exemplary embodiment of the present invention. FIG. 2 is a top plan view schematically explaining an arrangement of a trench according to an exemplary embodiment of the present invention of FIG. 1. FIG. 3 is a cross-sectional view taken along a line of FIG. 1. FIG. 4 is a cross-sectional view taken along a line IV-IV of FIG. 1. FIG. 5 is a perspective view of a microcavity according to an exemplary embodiment of the present invention.

Referring to FIG. 1, FIG. 3, and FIG. 4, thin film transistors Qa, Qb, and Qc are formed on a substrate 110 made of transparent glass or plastic.

An organic layer 230 is positioned on the thin film transistors Qa, Qb, and Qc, and a light blocking member 220 may be formed between neighboring organic layers 230. Here, the organic layer 230 may be a color filter.

FIG. 3 and FIG. 4 are cross-sectional views taken along the lines III-III and IV-IV, and certain elements shown in FIG. 1 as being between the substrate 110 and the organic layer 230 are omitted in FIG. 3 and FIG. 4 for clarity. In actuality, FIG. 3 and FIG. 4 include at least portions of the thin film transistors Qa, Qb, and Qc between the substrate 110 and the organic layer 230.

The organic layer 230 may extend generally along a column direction of the pixel electrode 191. The organic layer 230 may be a color filter, and each of the color filters 230 may display one of a primary color such as red, green, or blue. However, embodiments of the invention are not limited to these primary colors, and may also display any of cyan, magenta, yellow, and white-based colors, or any other color for display of an image.

As shown in FIG. 1, the neighboring organic layers 230 may be spaced apart from each other in a horizontal direction D and in a vertical direction crossing (and, here, generally perpendicular to) the horizontal direction D. FIG. 3 shows exemplary organic layers 230 that are separated from or spaced apart from each other in the horizontal direction D, and FIG. 4 shows organic layers 230 that are separated from each other in the vertical direction.

Referring to FIG. 3, longitudinal light blocking members 220b or black matrices are positioned between the organic layers 230 separated along the horizontal direction D. The longitudinal light blocking members 220b respectively overlap each edge of the neighboring organic layers 230, and a width by which the longitudinal light blocking members 220b overlap both edges of the organic layer 230 is substantially the same. That is, each side of the longitudinal light blocking members 220b overlaps its adjacent organic layer 230 to the same degree.

Referring to FIG. 4, a transverse light blocking member 220a is formed between neighboring organic layers 230 that are separated in the vertical direction. Transverse light blocking members 220a respectively overlap the neighboring organic layers 230, and the widths at which each transverse light blocking member 220a overlaps both edges of its adjacent organic layers 230 are substantially the same.

The lower passivation layer 170 and the upper passivation layer 180 are positioned on the organic layer 230 and the light blocking member 220. The lower passivation layer 170 may be formed of an organic material and may have a planarizing function, effectively flattening the uneven upper surfaces of their underlying layers. The upper passivation layer 180 may be formed of an inorganic material such as silicon oxide or silicon nitride. The upper passivation layer 180 may be omitted.

A pixel electrode 191 is positioned on the upper passivation layer 180, and the pixel electrode 191 is electrically connected to one terminal of the thin film transistors Qa and Qb through contact holes 185a and 185b.

A lower alignment layer 11 is formed on the pixel electrode 191, and the lower alignment layer 11 may be a vertical alignment layer. The lower alignment layer 11 can be a liquid crystal alignment layer made of one or more materials such as polyamic acid, polysiloxane, or polyimide.

A microcavity 400 is formed on the lower alignment layer 11. The microcavity 400 is a cavity that can hold a liquid. Here, the microcavity 400 is injected with a liquid crystal material including liquid crystal molecules 310, and the microcavity 400 has a liquid crystal injection hole A through which the liquid crystal material is injected. The microcavity 400 may be formed with a major axis extending along a column direction of the pixel electrodes 191, in other words, in a longitudinal direction. The minor axis of microcavity 400 extends laterally, or parallel to direction D of FIG. 1. In the present exemplary embodiment, the alignment material forming alignments layers 11 and 21, as well as a liquid crystal material including the liquid crystal molecules 310, may each be injected into the microcavity 400 by using a capillary force.

In the present exemplary embodiment, as shown in FIG. 2 and FIG. 3, an open part OPN is formed between the microcavity 400 neighboring in the horizontal direction and a trench SP is formed at both edges of the microcavity 400 adjacent to the microcavity 400 and the trenches SP may be formed over portions of the organic layer 230 and the transverse light blocking member 220b that overlap each other. More generally, the trenches SP may be formed over the light blocking member 220b. At this time, it is preferable that the first width w1 of the trench SP formed at the edge of the microcavity 400 is less than the cell gap of the liquid crystal layer including liquid crystal molecules 310, i.e. less than the height of the interior of the microcavity 400. As shown in FIG. 2, a space between neighboring short edges of the pixel electrodes 191a and 191b includes a region where a liquid crystal injection hole A of the microcavity 400 is formed, and may be referred to as an inlet part EP. The inlet part EP may have substantially the same width as the transverse light blocking member 220a.

The trench SP extends along the vertical direction or major axis of the microcavity 400, and the first length L1 corresponding to the length (as measured along the major axis) of the trench SP may extend to within the inlet part EP.

In FIG. 2, when viewed along the vertical direction, the trenches SP are not continuous, but instead are separated by gaps at the inlet part EP. However, this need not be the case, and embodiments of the invention contemplate continuous trenches SP that have no such gaps.

The cell gap of the liquid crystal layer may be in a range of more than about 2 um to less than about 10 urn.

In a manufacturing process of a liquid crystal display, not only the liquid crystal material may be injected through the liquid crystal injection hole A, but also an alignment material of which a solid and a solvent are mixed. That is, the manufacturing process involves first injecting the alignment material, drying the alignment material, and then injecting liquid crystal. More specifically, a drying process is performed after injection of the alignment material. At this time, the solid remaining when the solvent is volatilized may be agglomerated inside the microcavity 400. That is, when the alignment material is dried, its liquids vaporize but its solids are left behind. These solids form deposits within the microcavity 400. In conventional microcavity configurations, when the drying simultaneously starts at the two injection holes of both sides and the drying progresses toward the center portion of the microcavity 400, solids accumulate at the center of the microcavity 400, thereby generating a huddle defect, i.e. a dark spot formed by accumulation of dried solids from the aligning agent. Also, if the drying starts at one side of the liquid crystal injection hole, the solid may be agglomerated at the liquid crystal injection hole at the other side of the microcavity. In this way, if the solid is agglomerated inside the microcavity, a display defect such as light leakage or transmittance deterioration is generated.

In the present exemplary embodiment, if the trench SP is formed at the edge of the microcavity 400, agglomeration of aligning agent solids is decreased at the liquid crystal injection hole A, so that light leakage and other deleterious effects are minimized. If the width w1 of the trench SP is less than the cell gap of the liquid crystal layer, the capillary force of the trench SP structure is higher than the capillary force of the microcavity 400, so that the remaining solid may be induced to the trench SP. Like this, the remaining solid after the drying is spread to the trench SP thereby preventing agglomeration of the solid in a visible area.

In the present exemplary embodiment, one liquid crystal injection hole is disposed at both edges of the microcavity 400, as another exemplary embodiment, one liquid crystal injection hole may be only disposed at one edge of the microcavity 400.

The upper alignment layer 21 is positioned on the microcavity 400, and a common electrode 270 and an first overcoat 250 are formed on the upper alignment layer 21. The common electrode 270 receives a common voltage and the pixel electrode 191 receives a data voltage, so as to collectively generate an electric field within the liquid crystal. This electric field determines an inclination direction of the liquid crystal molecules 310 positioned in the minute space layer 400 between the two electrodes. The common electrode 270 and the pixel electrode 191 together form a capacitor (hereafter referred to as "a liquid crystal capacitor") to maintain the applied voltage after the thin film transistor is turned off. The first overcoat 250 may be formed of silicon nitride (SiNx) or silicon oxide (SiO2).

A supporting member 260 is positioned on the first overcoat 250. The supporting member 260 may include silicon oxycarbide (SiOC), a photoresist, or an organic material. When the supporting member 260 includes silicon oxycarbide (SiOC), a chemical vapor deposition method may be used, and when including the photoresist, a coating method may be applied. Among layers that may be formed through chemical vapor deposition, silicon oxycarbide (SiOC) layers have high transmittance and low layer stress. Accordingly, in the present exemplary embodiment, the supporting member 260 can be formed of silicon oxycarbide (SiOC) such that light is transmitted well and the layer is stable.

A groove GRV passing under the microcavity 400, the upper alignment layer 21, the common electrode 270, the first overcoat 250, and the supporting member 260 is formed over the transverse light blocking member 220a.

Next, the microcavity 400 will be described with reference to FIG. 1 and FIG. 3 to FIG. 5.

Referring to FIG. 1 and FIG. 3 to FIG. 5, the microcavity 400 is divided into individual cavities by a plurality of grooves GRV overlapping gate lines 121a, and a plurality of microcavity 400 are thereby formed along a direction D in which the gate line 121a generally extends. The plurality of microcavity 400 may respectively correspond to a pixel area, and multiple groups of the pluralities of microcavity 400 may be formed along the column direction. Here, pixel area may correspond to a region displaying the image.

The present exemplary embodiment has a thin film transistor and pixel electrode design structure in which two sub-pixel electrodes 191a and 191b are disposed via the gate line 121 interposed therebetween. Accordingly, one microcavity 400 corresponds to the first subpixel electrode 191a and the second subpixel electrode 191b of one pixel PX. However, any other thin film transistor or pixel design structure is contemplated, and the microcavity 400 may be formed over any such pixel.

At this time, the groove GRV formed between the microcavity 400 may extend along the direction D that the gate line 121a extends, and the liquid crystal injection holes A1 and A2 of the microcavity 400 form a region corresponding to a boundary of the groove GRV and the microcavity 400. The liquid crystal injection hole A is formed along a direction that the groove GRV extends. Also, an opening part OPN formed between neighboring microcavity 400 in the direction D that the gate line 121a extends may be covered by the supporting member 260 as shown in FIG. 3.

The liquid crystal injection hole A included in the microcavity 400 may be widely positioned between the supporting member 260 and the pixel electrode 191, but may be positioned between the upper alignment layer 21 and the lower alignment layer 11.

In the present exemplary embodiment, the groove GRV is formed to extend along the direction D that the gate line 121a extends. However, as another exemplary embodiment, a plurality of grooves GRV may be formed to extend along a direction that a data line 171 extends, so that multiple groups of the plurality microcavity 400 may be formed in a row direction. The liquid crystal injection hole A may be formed parallel to the direction along which the groove GRV extends.

A second overcoat 240 is positioned on the supporting member 260. The second overcoat 240 may be formed of silicon nitride ($SiN_x$) or silicon oxide ($SiO_2$). A capping layer 280 is positioned on the second overcoat 240. The capping layer 280 contacts the upper surface of the second overcoat 240 and the side surface of the supporting member 260, and the capping layer 280 covers the liquid crystal injection holes A of the microcavity 400 exposed by the groove GRV. The capping layer 280 may be made of a thermal hardening resin, silicon oxycarbide (SiOC), or graphene.

When the capping layer 280 is formed of graphene, the graphene has transmission resistance against a gas including helium, thereby acting as a capping layer for capping the liquid crystal injection hole A. The capping layer 280 may be made of a carbon combination such that the liquid crystal material is not contaminated even if it contacts the capping layer 280. Also, the graphene protects the liquid crystal material from oxygen or moisture from the outside.

In the present exemplary embodiment, the liquid crystal material is injected through the liquid crystal injection hole A of the minute space layer 400, thereby forming a liquid crystal display without the additional formation of an upper substrate. That is, the microcavities 400 hold a liquid crystal layer on the same substrate 110 as the pixel electrode 191 and common electrode 270, thus preventing the need for a second substrate. This has significant advantages, including allowing for a thinner display than conventional displays that use two substrates, as well as making for cheaper and more easily manufacturable displays.

An overcoat (not shown) made of an organic layer or an inorganic layer may be positioned on the capping layer 280. The overcoat protects the liquid crystal molecules 310 injected into the microcavity 400 from an external impact that may flatten them.

Next, again referring to FIG. 1 to FIG. 4, a liquid crystal display according to the present exemplary embodiment will be described.

Referring to FIG. 1 to FIG. 4, a plurality of gate conductors including a plurality of gate lines 121a, a plurality of step-down gate lines 121b, and a plurality of storage electrode lines 131 are formed on a substrate 110 made of transparent glass or plastic.

The gate lines 121a and the step-down gate lines 121b extend mainly in a transverse direction, and transmit gate signals. The gate line 121a includes a first gate electrode 124a and a second gate electrode 124b protruding upward and downward respectively in the view of FIG. 1, and the step-down gate line 121b includes a third gate electrode 124c protruding upward in the view of FIG. 1. The first gate electrode 124a and the second gate electrode 124b are connected to each other to form a single protrusion.

The storage electrode lines 131 are mainly extended in the transverse direction (i.e. along direction D in FIG. 1), and transfer a predetermined voltage such as a common voltage. Each storage electrode line 131 includes a storage electrode 129 protruding upward and downward from the storage electrode line 131 in the view of FIG. 1, a pair of longitudinal portions 134 extending substantially perpendicular to the gate lines 121a and 121b and downward, and a transverse portion 127 connecting ends of the pair of longitudinal portions 134. The transverse portion 127 includes a capacitive electrode 137 extending downward.

A gate insulating layer 140 is formed on the gate conductors 121a, 121b, and 131.

A plurality of semiconductor stripes (partially shown) that may be made of amorphous silicon or crystallized silicon are formed on the gate insulating layer 140. The semiconductor stripes mainly extend in the longitudinal direction, and include first and second semiconductors 154a and 154b protruding toward the first and second gate electrodes 124a and 124b and connected to each other, and a third semiconductor 154c disposed on the third gate electrode 124c.

A plurality of pairs of ohmic contacts (not shown) are formed on the semiconductors 154a, 154b, and 154c. The ohmic contacts may be made of silicide or of n+ hydrogenated amorphous silicon doped with an n-type impurity at a high concentration.

A data conductor including a plurality of data lines 171, a plurality of first drain electrodes 175a, a plurality of second drain electrodes 175b, and a plurality of third drain electrodes 175c is formed on the ohmic contacts.

The data lines 171 transmit data signals and extend in a longitudinal direction, thereby intersecting, though insulated from, the gate line 121a and the step-down gate line 121b. Each data line 171 includes a first source electrode 173a and a second source electrode 173b extending toward the first gate electrode 124a and the second gate electrode 124b respectively, and connected to each other.

The first drain electrode 175a, the second drain electrode 175b, and a third drain electrode 175c each include one end having a wide area and the other end having a bar type shape. Bar ends of the first drain electrode 175a and the second drain electrode 175b are partially enclosed by the first source electrode 173a and the second source electrode 173b. The wide end of the first drain electrode 175a also has a portion extending to semiconductor 154c, thereby forming a third source electrode 173c which is curved to have a "U" shape. A wide end 177c of the third drain electrode 175c overlaps the capacitive electrode 137 thereby forming a step-down capacitor Cstd, and the bar end is partially enclosed by the third source electrode 173c.

The first gate electrode 124a, the first source electrode 173a, and the first drain electrode 175a form a first thin film transistor Qa along with the first semiconductor 154a; the second gate electrode 124b, the second source electrode 173b, and the second drain electrode 175b form a second thin film transistor Qb along with the second semiconductor 154b; and the third gate electrode 124c, the third source electrode 173c, and the third drain electrode 175c form a third thin film transistor Qc along with the third semiconductor 154c.

The semiconductor stripes including the first semiconductor 154a, the second semiconductor 154b, and the third semiconductor 154c except for the channel region between the source electrodes 173a, 173b, and 173c, and the drain electrodes 175a, 175b, and 175c have substantially the same plane shape as the data conductors 171a, 171b, 173a, 173b, 173c, 175a, 175b, and 175c and the underlying ohmic contacts (i.e., the same shape in the plan view of FIG. 1).

The first semiconductor 154a includes a portion that is not covered by the first source electrode 173a and the first drain electrode 175a to be exposed between the first source electrode 173a and the first drain electrode 175a, the second semiconductor 154b includes a portion that is not covered by the second source electrode 173b and the second drain electrode 175b to be exposed between the second source electrode 173b and the second drain electrode 175b, and the third semiconductor 154c includes a portion that is not covered by the third source electrode 173c and the third drain electrode 175c to be exposed between the third source electrode 173c and the third drain electrode 175c.

A lower passivation layer (not shown) made of an inorganic insulator such as silicon nitride or silicon oxide is formed on the data conductors 171a, 171h, 173a, 173b, 173c, 175a, 175b, and 175c and the exposed first, second, and third semiconductors 154a, 154b, and 154c.

The organic layer 230 may be positioned on the lower passivation layer. The organic layer 230 is present across most of the display area except for positions where the first thin film transistor Qa, the second thin film transistor Qb, and the third thin film transistor Qc are disposed. However, it may extend in the longitudinal direction along the space between adjacent data lines 171. In the present exemplary embodiment, the organic layer 230 may be a color filter, and the color filter 230 may be formed under the pixel electrode 191. However, it may alternatively be formed on the common electrode 270.

The light blocking member 220 is positioned on a region where the organic layer 230 is not present, and on a portion of the organic layer 230. That is, light blocking members 220 are positioned between, and slightly overlapping, neighboring organic layers 230. The light blocking member 220 includes transverse light blocking member 220a extending along the gate line 121a and the step-down line 121b, and covering the region at which the first thin film transistor Qa, the second thin film transistor Qb, and the third thin film transistor Qc are disposed, as well as longitudinal light blocking member 220b that extends along the data line 171.

The light blocking member 220 is referred to as a black matrix, and prevents light leakage.

The lower passivation layer and the light blocking member 220 have a plurality of contact holes 185a and 185b exposing the first drain electrode 175a and the second drain electrode 175b, respectively.

Also, the lower passivation layer 170 and the upper passivation layer 180 are formed on the organic layer 230 and the light blocking member 220 and a pixel electrode 191 including a first sub-pixel electrode 191a and a second sub-pixel electrode 191b is formed on the upper passivation layer 180. The first sub-pixel electrode 191a and the second sub-pixel electrode 191b are positioned on opposite sides of the gate line 121a and the step-down gate line 121b, and are disposed upward and downward such that they are adjacent to each other in the column direction. The height of the second sub-pixel electrode 191b is greater than the height of the first sub-pixel electrode 191a, and may be in a range of about 1 to 3 times that of the first sub-pixel electrode 191a.

Each overall shape of the first sub-pixel electrode 191a and the second sub-pixel electrode 191b is a quadrangle, and the first sub-pixel electrode 191a and the second sub-pixel electrode 191b respectively include a cross stem including transverse stems 193a and 193b and longitudinal stems 192a and 192b crossing the transverse stems 193a and 193b. Also, the first sub-pixel electrode 191a and the second sub-pixel electrode 191b respectively include a plurality of minute branches 194a and 194b, and protrusions 197a and 197b protruding upward or downward from the edge of the sub-pixel electrodes 191a and 191h.

The pixel electrode 191 is divided into four sub-regions by the transverse stems 193a and 193b and the longitudinal stems 192a and 192b. The minute branches 194a and 194b obliquely extend from the transverse stems 193a and 193b and the longitudinal stems 192a and 192b, and the extending direction thereof forms an angle of about 45 degrees or 135 degrees with the gate lines 121a and 121b or the transverse stems 193a and 193b. Also, the minute branches 194a and 194b of two neighboring sub-regions may be crossed.

In the present exemplary embodiment, the first sub-pixel electrode 191a further includes an outer stem enclosing the outer portion, and the second sub-pixel electrode 191b further includes a transverse portion disposed on the upper and lower portions and right and left longitudinal portions 198 disposed on the right and left sides of the second sub-pixel electrode 191b. The right and left longitudinal portions 198 may prevent capacitive coupling between the data line 171 and the first sub-pixel electrode 191a.

The lower alignment layer 11, the microcavity 400, the upper alignment layer 21, the common electrode 270, the first overcoat 250, and the capping layer 280 are formed on the pixel electrode 191, and the description of these constituent elements is not repeated here.

The above described liquid crystal display is but one embodiment representing one application of the invention. One of ordinary skill in the art will realize that other applications exist. For example, one of ordinary skill in the art will realize that embodiments of the invention can be implemented in other displays besides a liquid crystal display.

A manufacturing method for a liquid crystal display according to another exemplary embodiment of the present invention will be described with reference to FIG. 6 to FIG. 12. FIG. 6 to FIG. 12 are cross-sectional views of a method of manufacturing a liquid crystal display according to another exemplary embodiment of the present invention, and these figures sequentially show stages in the fabrication of a liquid crystal display as viewed from the cross-section taken along the line III-III of FIG. 1.

Figure 6:
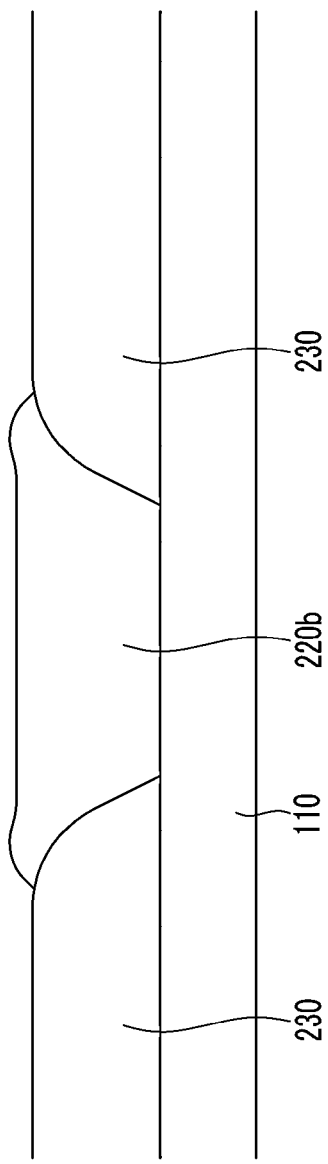
FIG. 6 to FIG. 12 are cross-sectional views of a manufacturing method of a liquid crystal display according to another exemplary embodiment of the present invention.

Referring to FIG. 6, thin film transistors Qa, Qb, and Qc (shown in FIG. 1) are formed on a substrate 110 made of transparent glass or plastic. An organic layer 230 corresponding to a pixel area is formed on the thin film transistors Qa, Qb, and Qc, and a light blocking member 220, including transverse light blocking member 220a and longitudinal light blocking member 220b, is formed between the neighboring organic layers 230. As shown in FIG. 6, the longitudinal light blocking member 220b overlaps the edges of its neighboring organic layers 230. As the overlapping of the longitudinal light blocking member 220b and the organic layer 230 is increased, a resulting step, or bumplike protrusion, may be generated in the upper surface of member 220b by a leveling effect. The height of the step may be controlled by controlling the interval overlapping the organic layer 230 (i.e., the amount of overlap between the member 220b and layer 230) when forming the longitudinal light blocking member 220b. In this manner, each step or protrusion may be independently fabricated to a range of heights, or may be made to not exist at all.

Here, the organic layer 230 may be a color filter.

Figure 7:
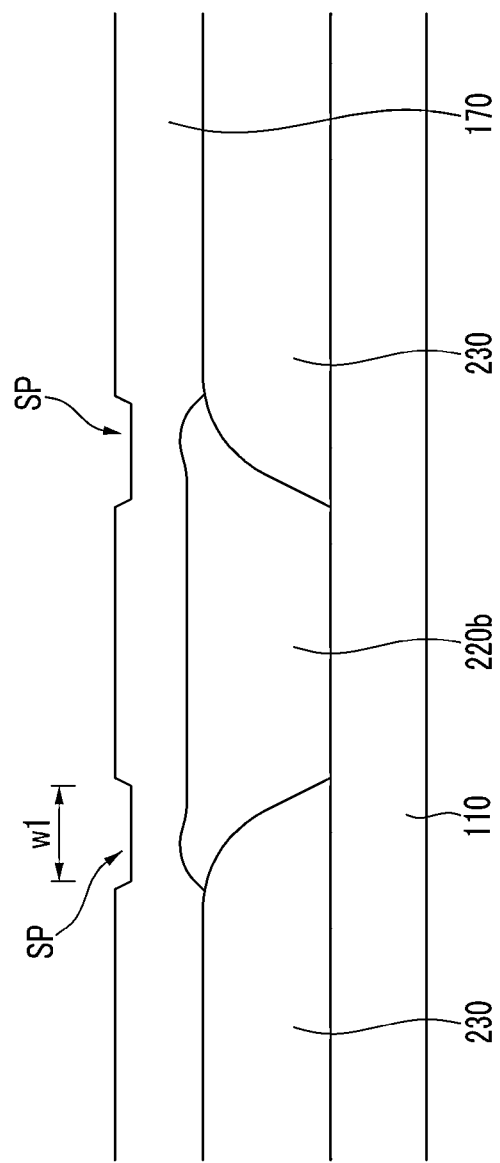

Referring to FIG. 7, the lower passivation layer 170 is formed on the organic layer 230 and the light blocking member 220. The lower passivation layer 170 may be formed of an organic material. The lower passivation layer 170 is patterned to be elongated in, i.e. to extend along, the vertical direction, and the trench SP having the first width w1 is formed. As shown in FIG. 2, the trench SP is positioned between pixels that are adjacent in the horizontal direction, and the trench SP may be positioned over that portion of the longitudinal light blocking member 220b that overlaps the organic layer 230.

Figure 8:
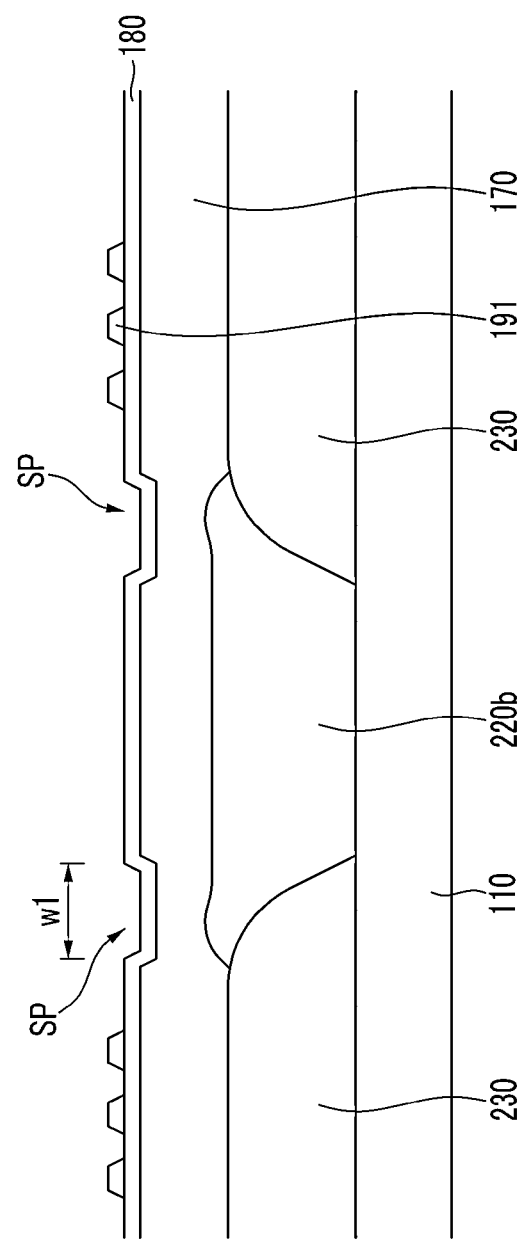

Referring to FIG. 8, the upper passivation layer 180 is formed on the lower passivation layer 170. The upper passivation layer 180 may be formed of an inorganic material such as silicon oxide or silicon nitride, and may be omitted if so desired. Next, after forming a pixel electrode material on the upper passivation layer 180, the pixel electrode material is patterned to form the pixel electrode 191 in the pixel area, and at this time, the pixel electrode 191 is electrically connected to one terminal of the thin film transistors Qa and Qb through the contact holes 185a and 185b (shown in FIG. 1). The pixel electrode 191 formed by patterning the pixel electrode material may have the shape shown in FIG. 2, however it is not limited thereto and the design of the pixel electrode 191 may take on any suitable shape.

Figure 9:
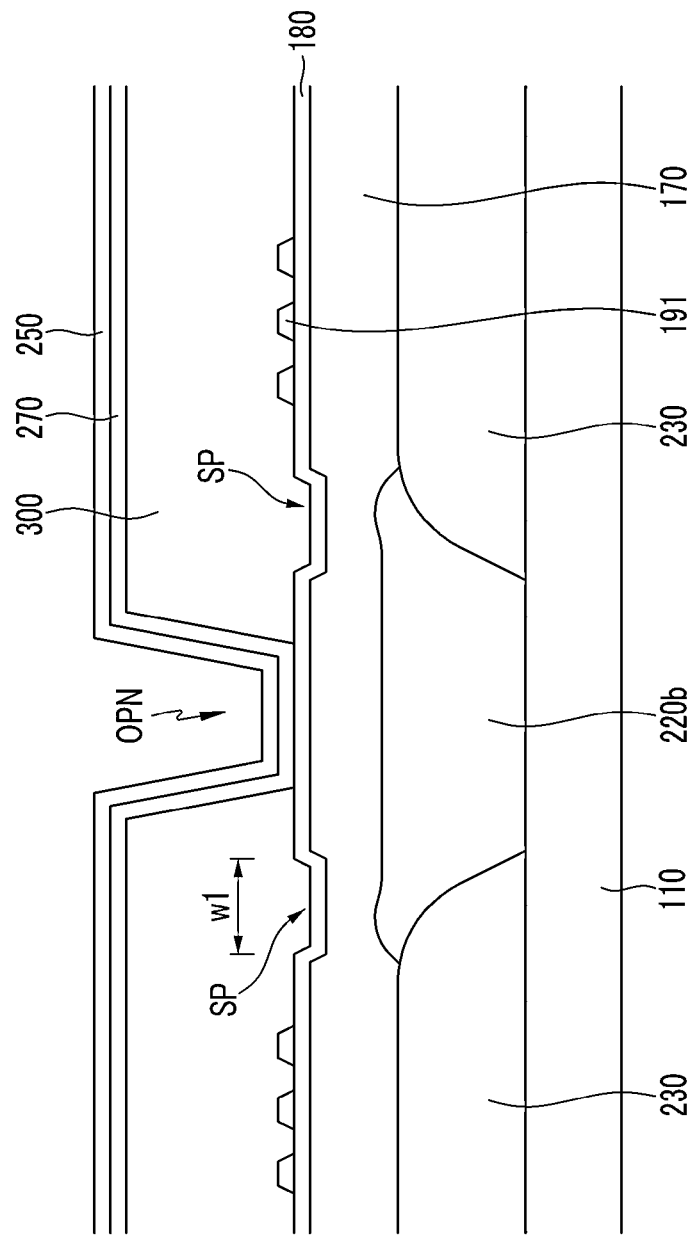

Referring to FIG. 9, a sacrificial layer 300 including silicon oxycarbide (SiOC) or a photoresist is formed on the pixel electrode 191. The sacrificial layer 300 may be formed of an organic material as well as silicon oxycarbide (SiOC) or a photoresist.

The sacrificial layer 300 is patterned to form an open part OPN on the longitudinal light blocking member 200b. The open part OPN may divide the microcavity 400 in the horizontal direction.

The common electrode 270 and the first overcoat 250 are sequentially formed on the sacrificial layer 300. The common electrode 270 may be made of a transparent conductor such as ITO or IZO, and the first overcoat 250 may be made of silicon nitride (SiNx) or silicon oxide (SiO2). The common electrode 260 and the first overcoat 250 may cover the open part OPN between the microcavity 400.

Figure 10:
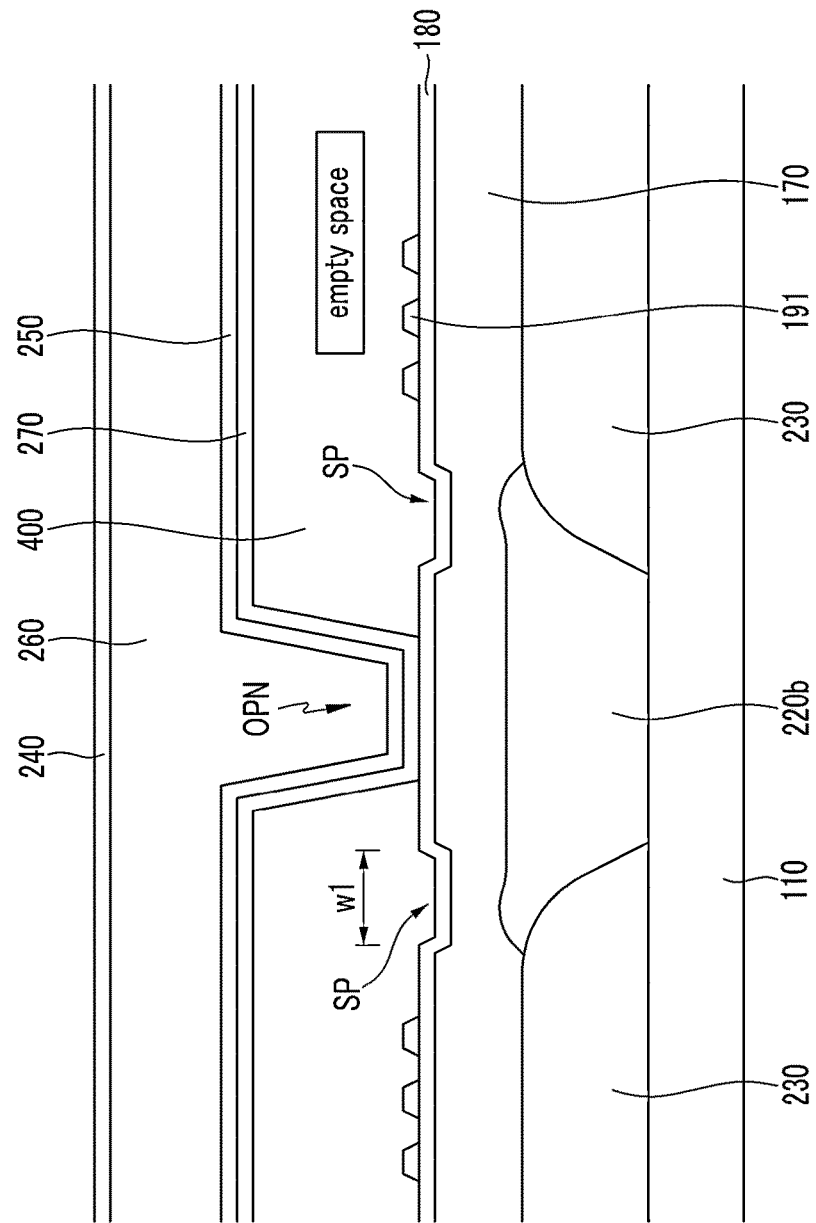

Referring to FIG. 10, a supporting member 260 and a second overcoat 240 are sequentially formed on the overcoat 250. The supporting member 260 according to the present exemplary embodiment may be made of a different material from the sacrificial layer 300. The second overcoat 240 may be made of silicon nitride (SiNx) or silicon oxide (SiO2).

Figure 11:
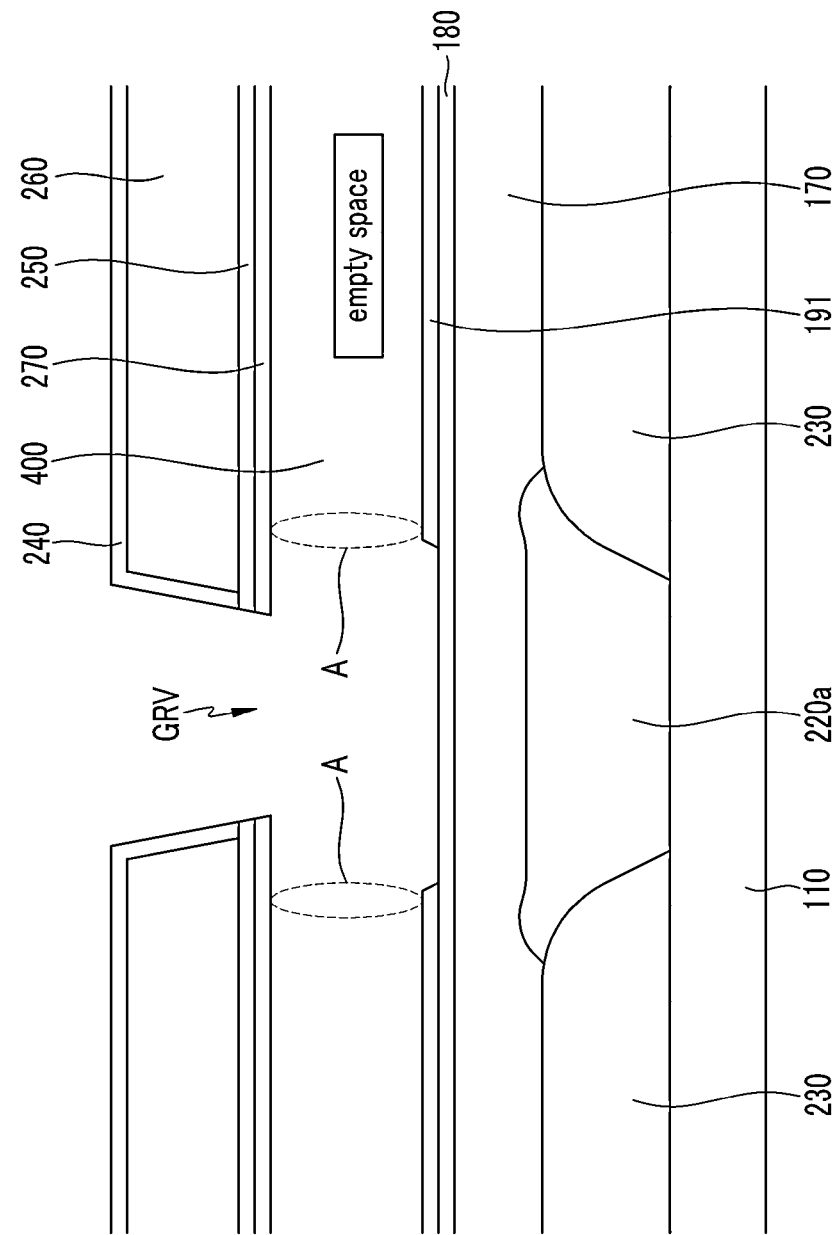

FIG. 11 is a cross-sectional view taken along the line IV-IV of FIG. 1 during the fabrication step of FIG. 10. Referring to FIG. 11, before forming the second overcoat 240, the supporting member 260 is patterned to form a groove GRV exposing the first overcoat 250 at a position corresponding to the transverse light blocking member 220a. The portions of the second overcoat 240, the first overcoat 250, and the common electrode 270 over the groove GRV are sequentially patterned to expose the sacrificial layer 300, and the sacrificial layer 300 is then removed through the groove GRV by an $O_2$ ashing process or a wet etching method. A microcavity 400 having the liquid crystal injection hole A is thereby formed. The microcavity 400 is an empty space where the sacrificial layer 300 has been removed. The liquid crystal injection hole A may be formed along a direction parallel to the signal line connected to one terminal of the thin film transistor. If the sacrificial layer 300 is removed, as shown in FIG. 10, the common electrode 270, the overcoat 250, and the supporting member 260 cover the open part OPN such that an edge side wall of the microcavity 400 is formed as a partition.

Figure 12:
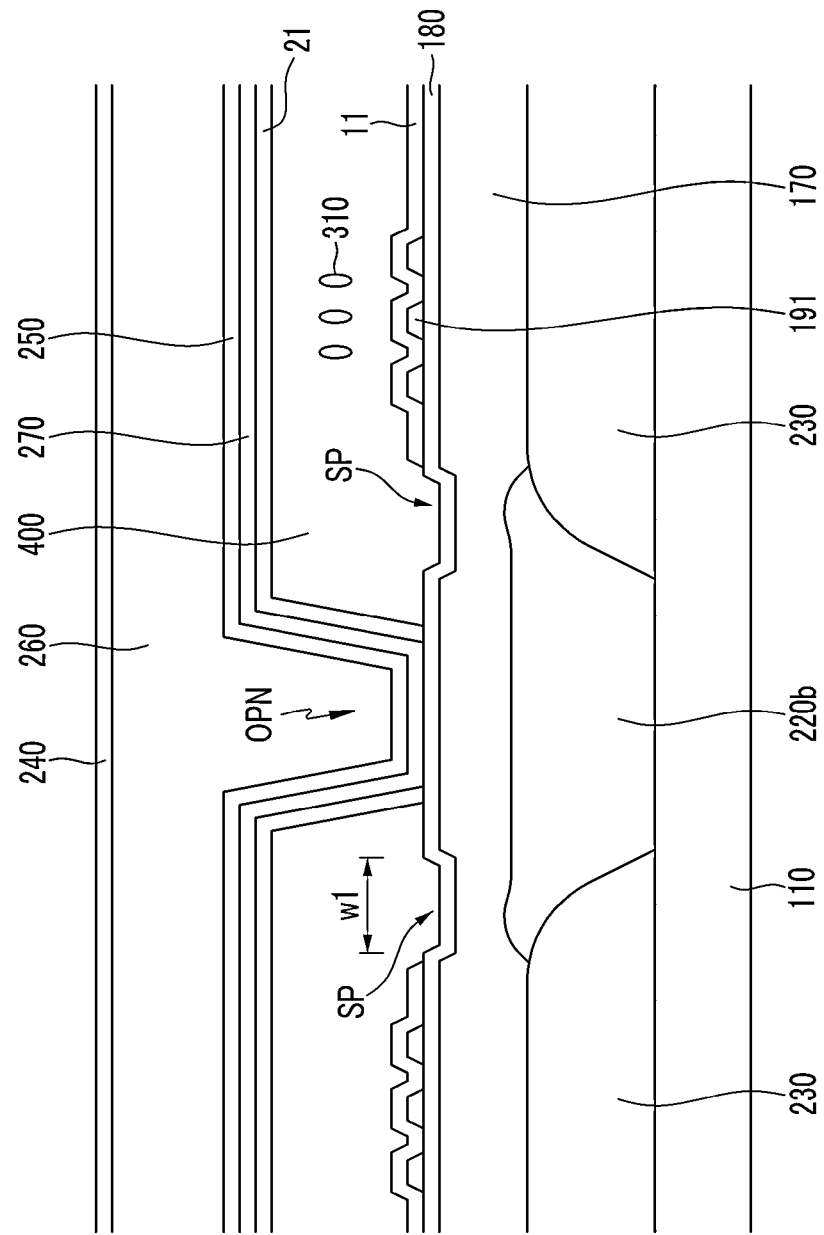

Referring to FIG. 12, an alignment material is injected through the liquid crystal injection hole A shown in FIG. 11 to form alignment layers 11 and 21 on the pixel electrode 191 and the common electrode 270. The alignment material has both solids and a solvent. A baking process is performed after injecting the alignment material through the liquid crystal injection holes A. At this time, the alignment layer is formed while the solvent of the alignment material is volatilized and the remaining solids are induced to accumulate within the trench SP while drying progresses to the side of the liquid crystal injection hole A. The solid induced to accumulate within the trench SP may be dragged to the inlet part EP shown in FIG. 2, or may remain in the trench SP. Either way, since both the trench SP and inlet part EP are positioned over the light blocking member 220, deleterious effects from accumulation of aligning agent solids, such as light leakage, may be prevented. The width w1 of the trench SP is less than the cell gap and the capillary force preferentially acts at this portion, such that solids may be induced to accumulate in the trench SP.

Next, a liquid crystal material including liquid crystal molecules 310 is injected into the microcavity 400 through the groove GRV and the liquid crystal injection holes A using an inkjet method.

Next, the capping layer 280 covering the upper surface and the side surface of the supporting member 260 is formed, and at this time, the capping layer 280 covers the liquid crystal injection holes A of the microcavity 400 exposed by the groove GRV, thereby completing the liquid crystal display shown in FIG. 3 and FIG. 4.

Figure 13:
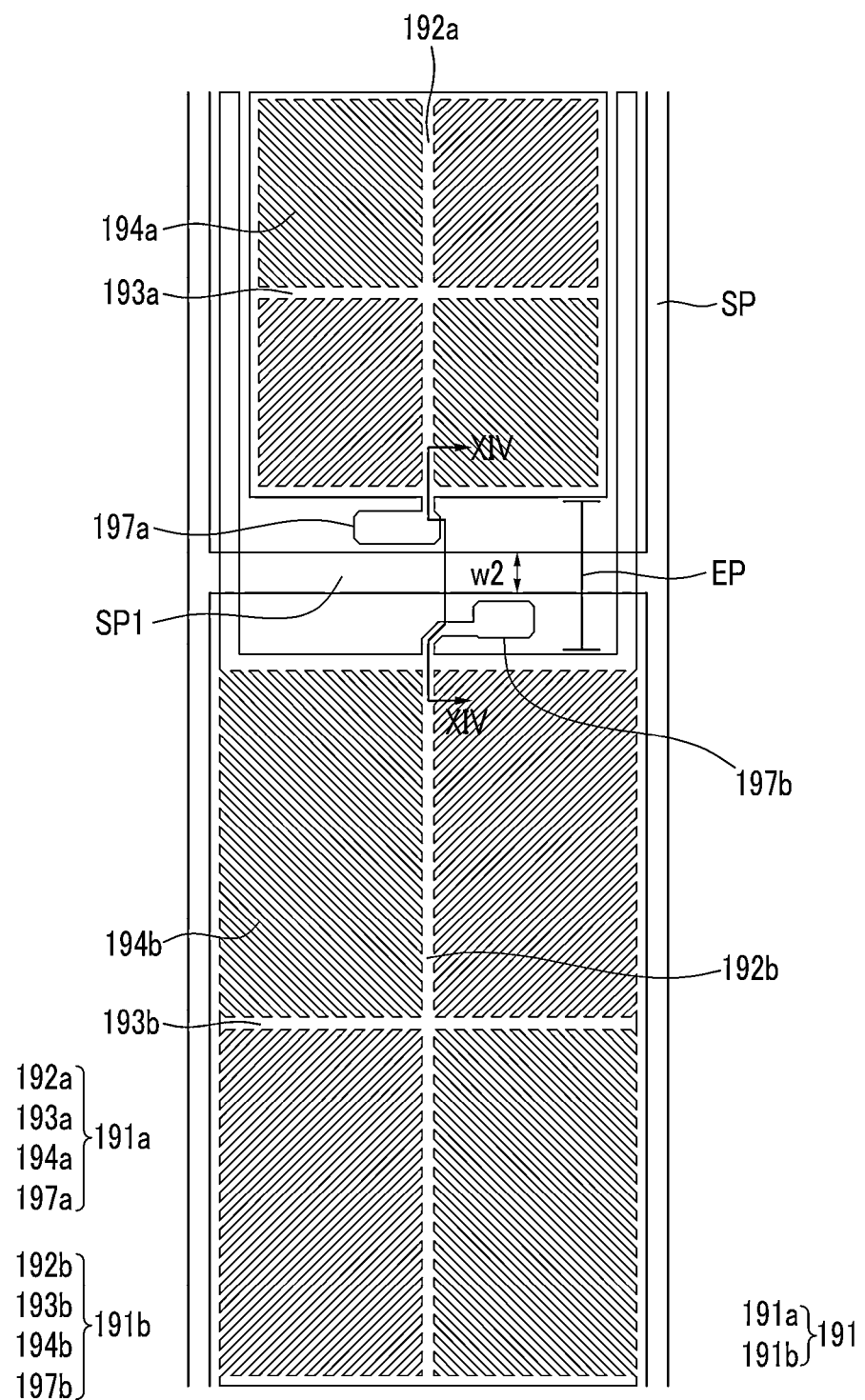
FIG. 13 is a top plan view viewing a liquid crystal display according to an exemplary embodiment of the present invention.
Figure 14:
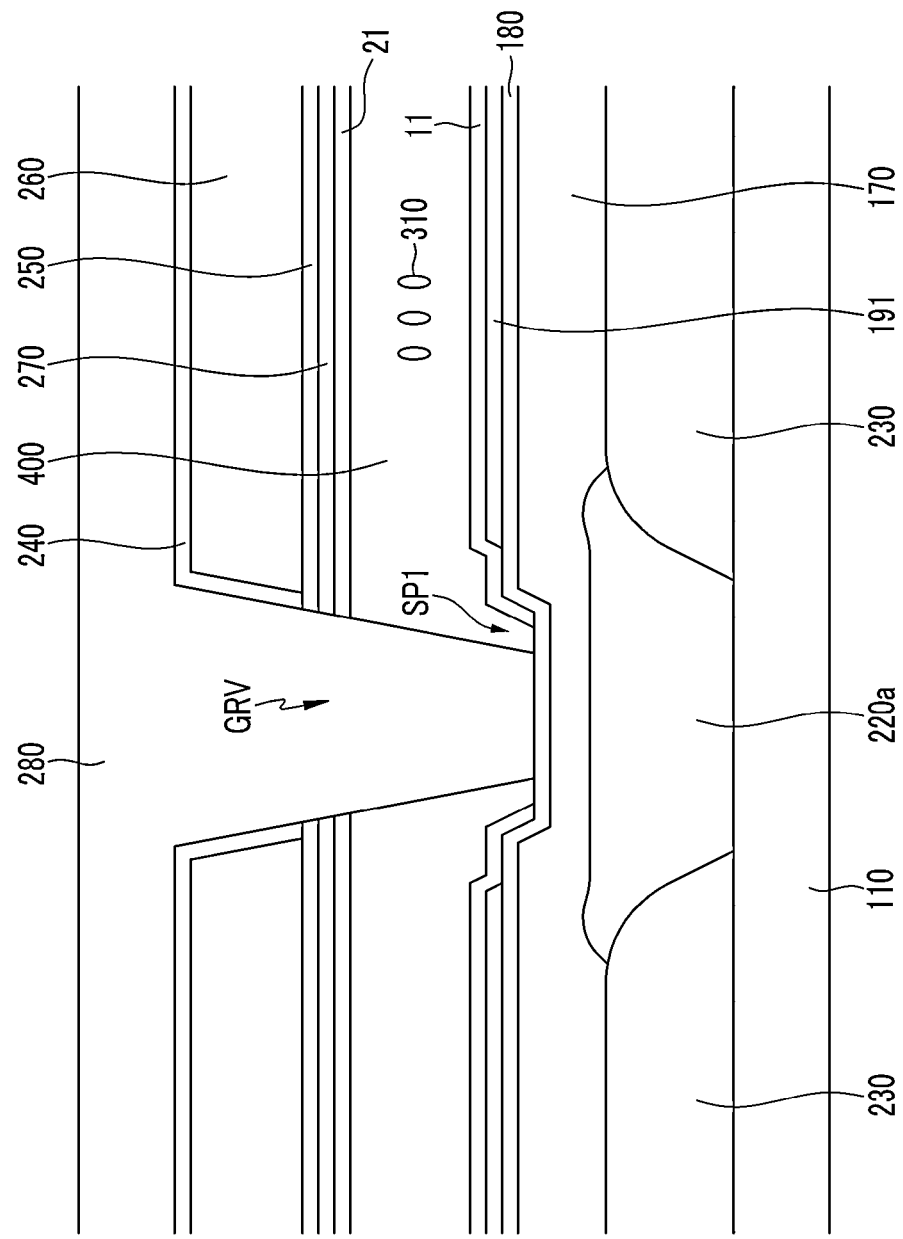
FIG. 14 is a cross-sectional view taken along the line XIV-XIV of FIG. 13.

FIG. 13 is a top plan view of a liquid crystal display according to an exemplary embodiment of the present invention. FIG. 14 is a cross-sectional view taken along the line XIV-XIV of FIG. 13.

Referring to FIG. 13 and FIG. 14, many elements are the same as the exemplary embodiment described with reference to FIG. 1, FIG. 3, and FIG. 4. However, as shown in FIG. 13, the trenches SP extending in the vertical direction at both edges of the microcavity 400 are also extended in the horizontal direction, thereby forming an additional storage trench SP1. The storage trench SP1 is formed within the inlet part EP, so that some solids are dragged into the inlet part EP from the trench SP in the microcavity 400, to be gathered at the storage trench SP1. The width w2 of the storage trench SP1 may be controlled to be within the interval of the inlet part EP. That is, the storage trench SP1 lies within, and is no wider than, inlet part EP.

In the present exemplary embodiment, the inlet part EP lies over the light blocking member 220, and when the remaining solid is gathered at the storage trench SP1, the alignment layer that is vertically aligned may be formed at the inlet part EP. The alignment layer that is vertically aligned makes a black state such that there is a merit of reducing the material cost of the light blocking member formed at the inlet part EP.

Most of the description in FIGS. 1, 3, and 4 may be applied to the exemplary embodiment described in FIG. 13 and FIG. 14, except for the storage trench SP1 added to the described exemplary embodiment. Accordingly, redundant explanations have been omitted.

Next, a method of manufacturing a liquid crystal display according to another exemplary embodiment of the present invention will be described with reference to FIG. 15 to FIG. 21. FIG. 15 to FIG. 21 are cross-sectional views sequentially showing stages in the fabrication of a liquid crystal display as viewed from the cross-section taken along the line XIV-XIV of FIG. 13.

Figure 15:
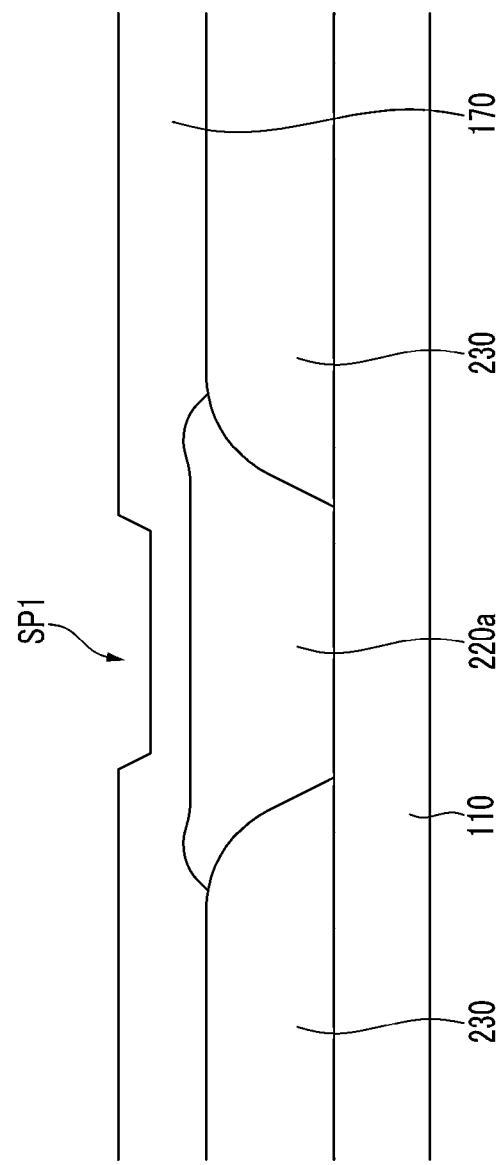
FIG. 15 to FIG. 21 are cross-sectional views of a manufacturing method of a liquid crystal display according to another exemplary embodiment of the present invention.

Referring to FIG. 15, thin film transistors Qa, Qb, and Qc (shown in FIG. 1) are formed on a substrate 110 made of transparent glass or plastic. Organic layers 230 corresponding to a pixel area are formed on the thin film transistors Qa, Qb, and Qc, and blocking members 220 including transverse light blocking members 220a and longitudinal light blocking members 220b are formed between neighboring organic layers 230. As shown in FIG. 15, each transverse light blocking member 220a overlaps the edges of its neighboring organic layers 230. As the overlapping of the transverse light blocking member 220a and the organic layer 230 is increased, the step or vertical protrusion produced by the leveling effect may be generated. When forming the transverse light blocking members 220a, the heights of the step protrusions may be controlled by controlling the amount of overlap with the organic layer 230, or alternatively a step may not be generated.

Here, the organic layer 230 may be a color filter.

The lower passivation layer 170 is formed on the organic layer 230 and the light blocking member 220. The lower passivation layer 170 may be formed of an organic material. The first passivation layer 170 is patterned to form a storage trench SP1 extending in the horizontal direction and having a second width L2. As shown in FIG. 13, the storage trench SP1 is formed within the inlet part EP such that it overlaps the transverse light blocking member 220a. The storage trench SP1 may be simultaneously formed along with the trench SP extending in the vertical direction and having the first width w1.

Figure 16:
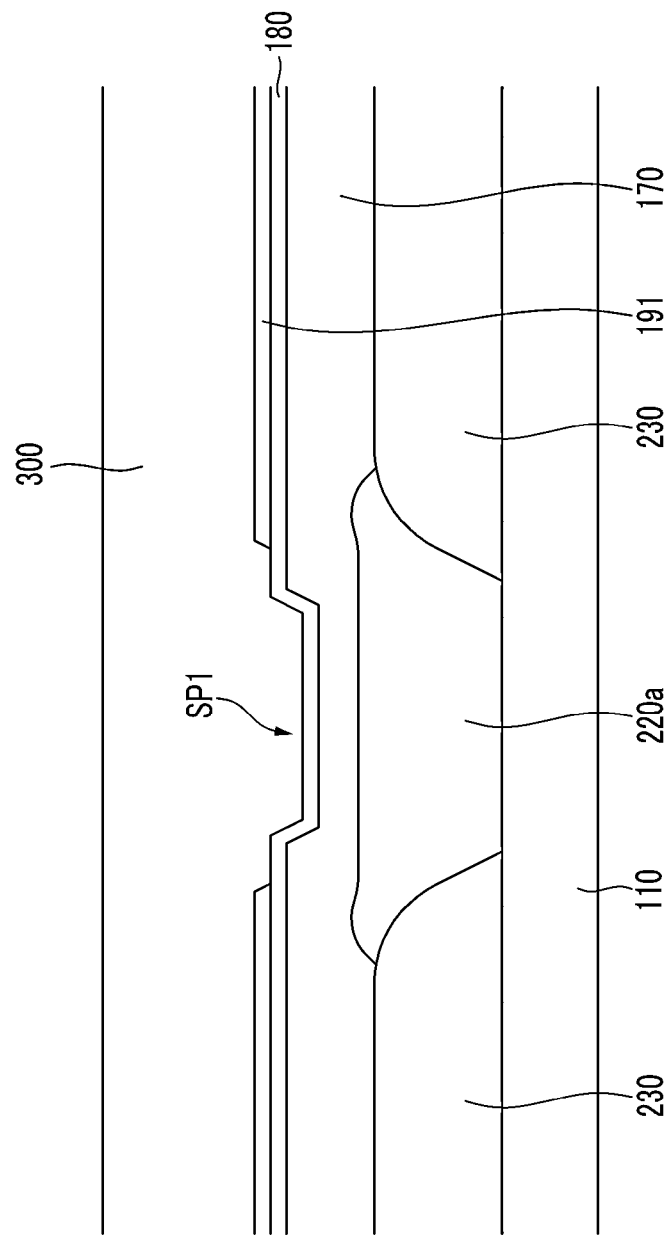

Referring to FIG. 16, the upper passivation layer 180 is formed on the lower passivation layer 170. The upper passivation layer 180 may be formed of an inorganic material such as silicon oxide or silicon nitride, and may be omitted if desired. Next, after forming a pixel electrode material on the upper passivation layer 180, the pixel electrode material is patterned to form the pixel electrode 191 to be positioned at the pixel area, and at this time, the pixel electrode 191 is electrically connected to one terminal of the thin film transistors Qa and Qb through the contact holes 185a and 185b (shown in FIG. 1). The pixel electrode 191 formed by patterning the pixel electrode material may have the shape shown in FIG. 13, however it is not limited thereto and the design of the pixel electrode 191 may take on any other suitable shape.

A sacrificial layer 300 including silicon oxycarbide (SiOC) or a photoresist is formed on the pixel electrode 191. The sacrificial layer 300 may be formed of an organic material as well as silicon oxycarbide (SiOC) or photoresist.

Figure 17:
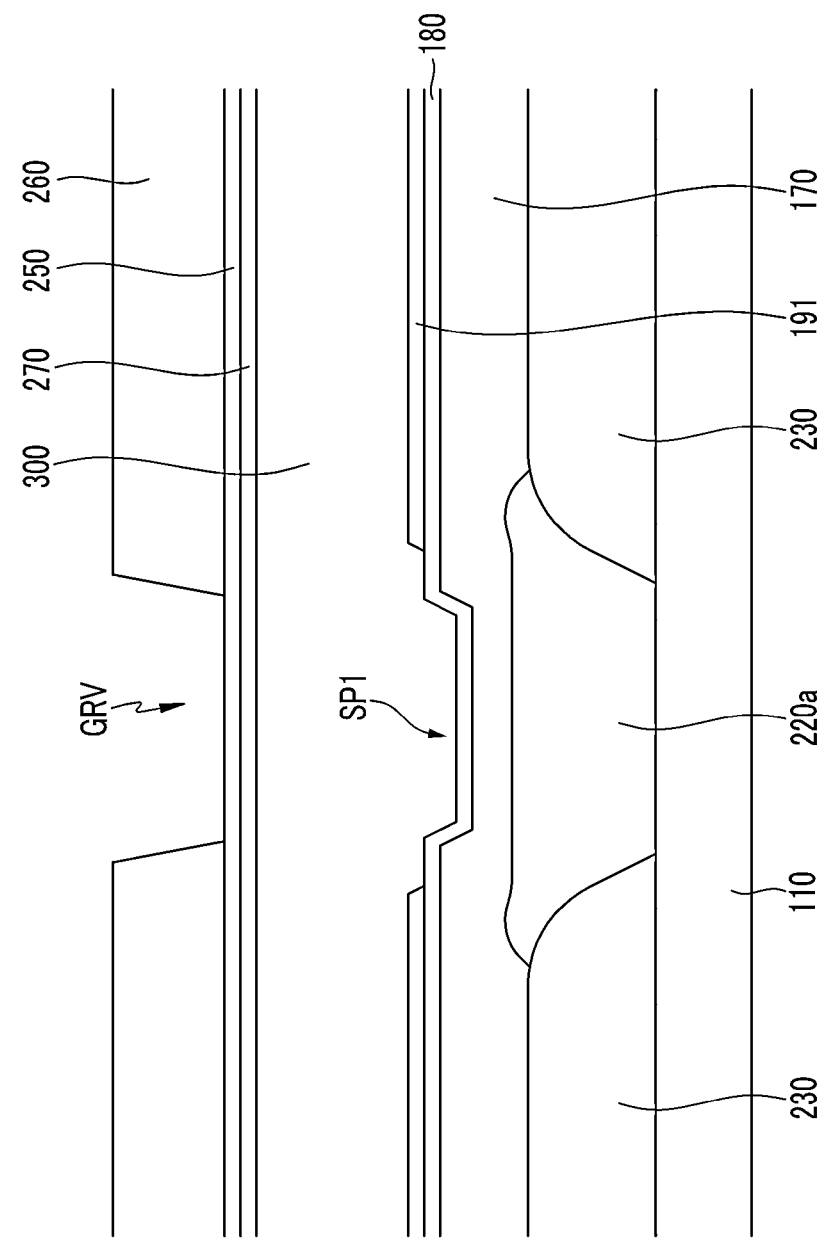

Referring to FIG. 17, a common electrode 270, an overcoat 250, and a supporting member 260 are sequentially formed on the sacrificial layer 300. The common electrode 270 may be made of a transparent conductor such as ITO or IZO, and the first overcoat 250 may be made of silicon nitride ($SiN_x$) or silicon oxide ($SiO_2$). The supporting member 260 according to the present exemplary embodiment may be made of a different material from the sacrificial layer 300.

The supporting member 260 is patterned to form a groove GRV exposing the first overcoat 250 at positions over the transverse light blocking member 220a.

Figure 18:
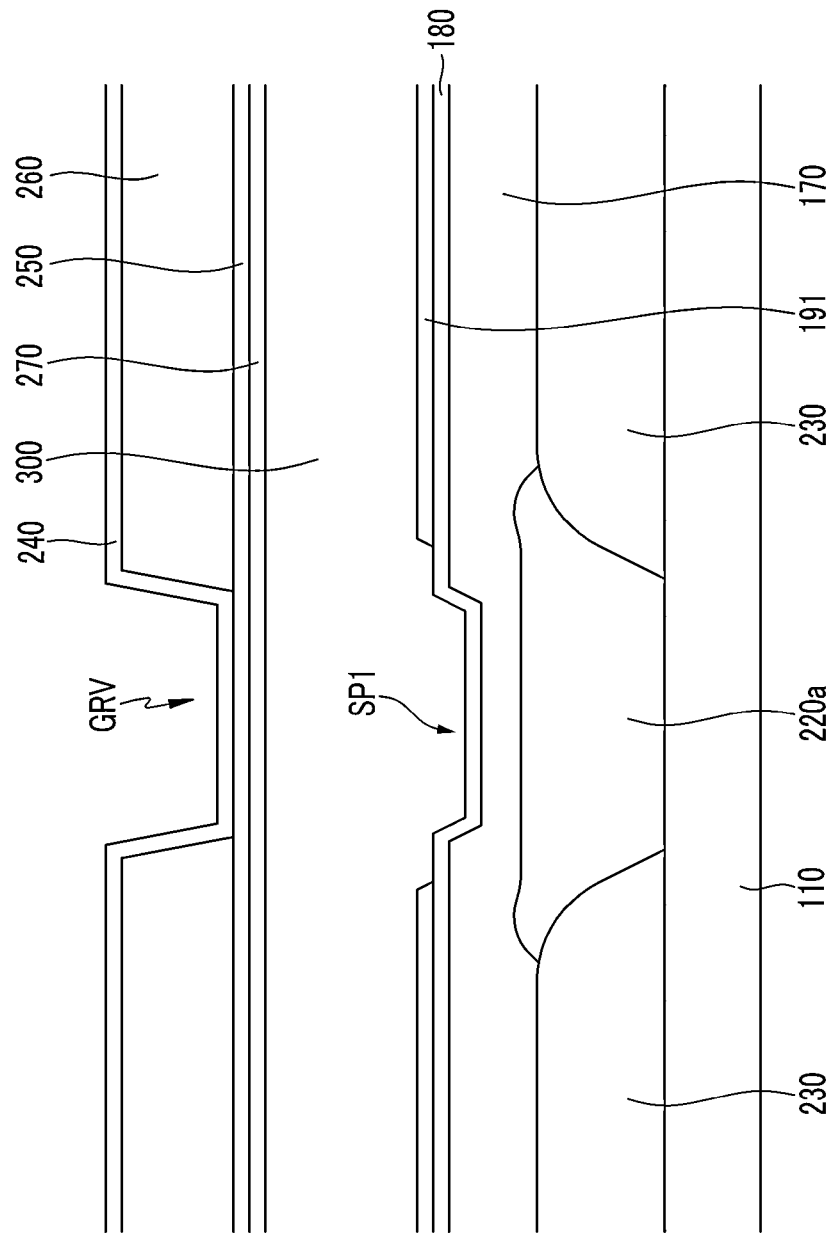

Referring to FIG. 18, a second overcoat 240 covering the exposed first overcoat 250 and supporting member 260 is formed. The second overcoat 240 may be formed of silicon nitride (SiNx) or silicon oxide (SiO2).

Figure 19:
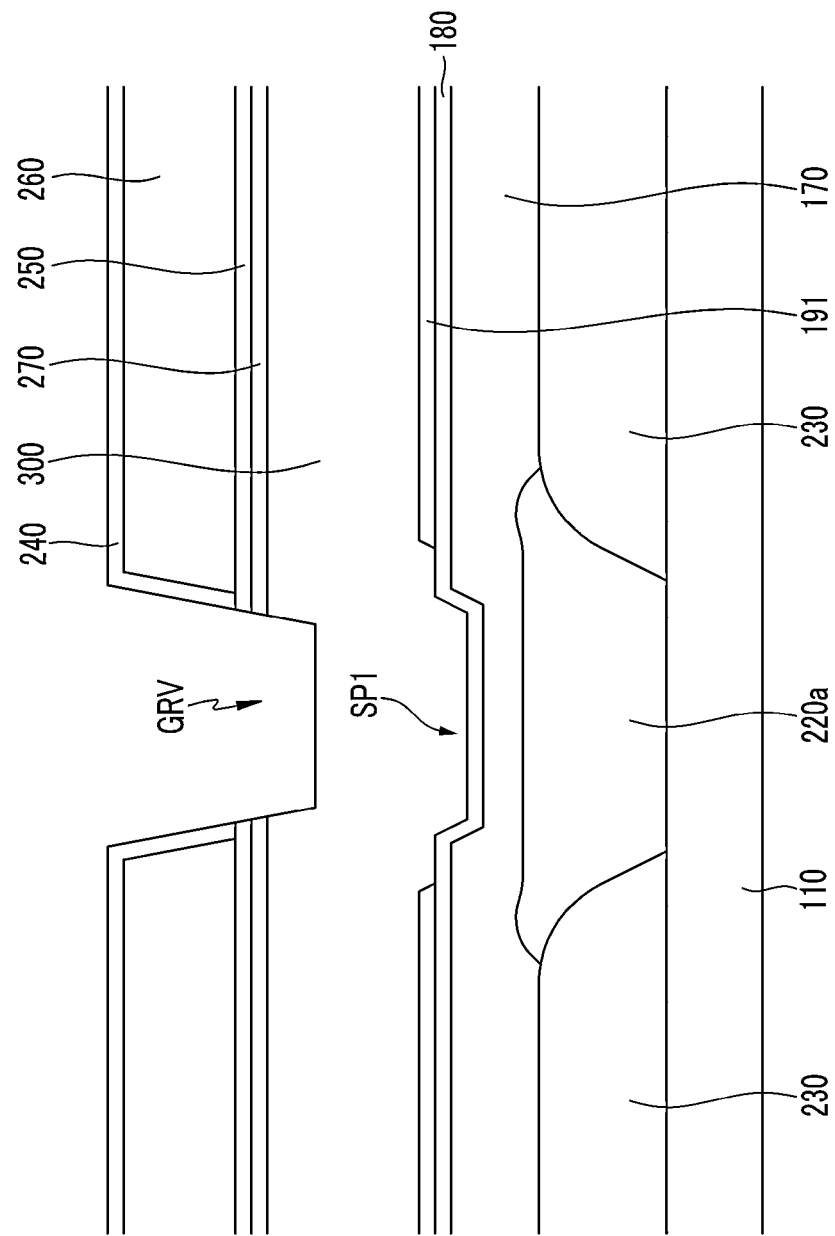

Referring to FIG. 19, the second overcoat 240, the first overcoat 250 and the common electrode 270 corresponding to the groove GRV are sequentially patterned to expose the sacrificial layer 300. At this time, a portion of the sacrificial layer 300 under the groove GRV may be removed.

Figure 20:
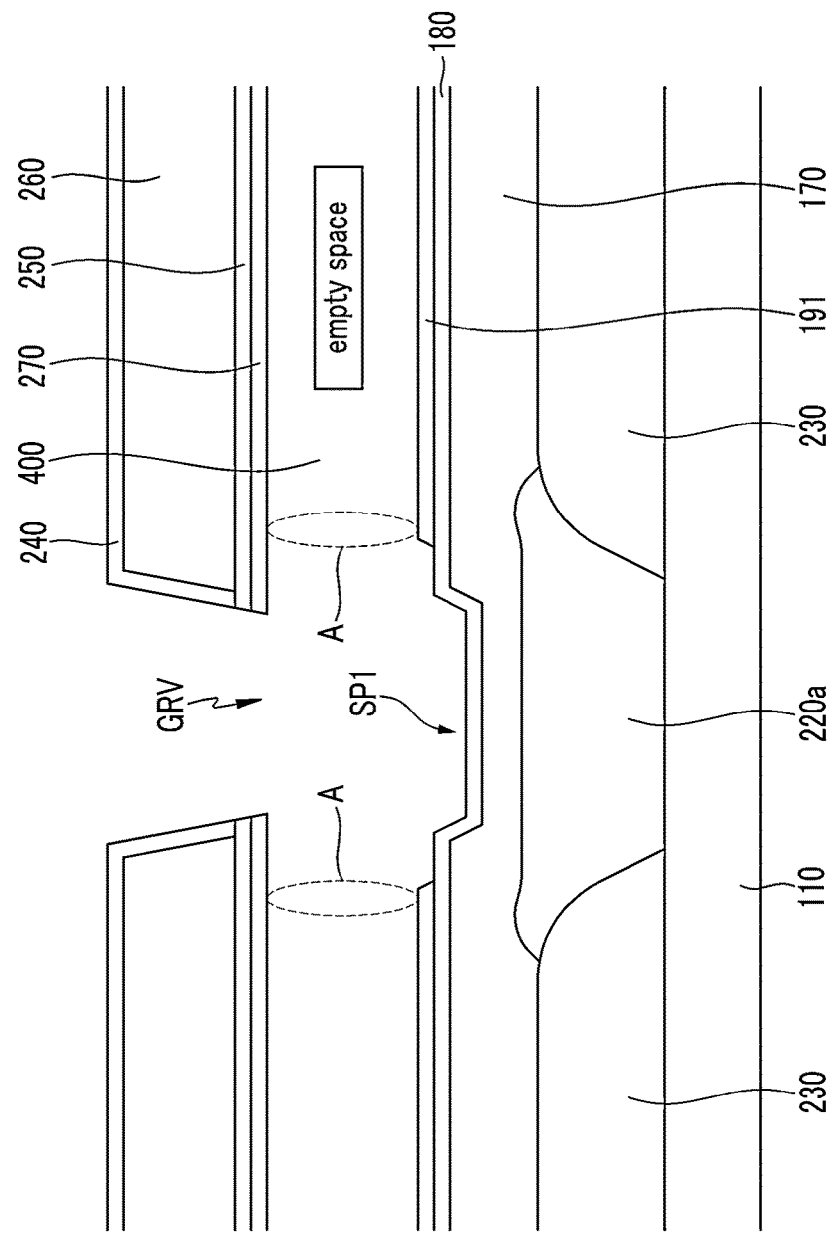

Referring to FIG. 20, the sacrificial layer 300 is removed through the groove GRV by an $O_2$ ashing process or a wet etching method. A microcavity 400 having liquid crystal injection hole A is thereby formed. The microcavity 400 is an empty space where the sacrificial layer 300 is removed, and forms a cavity capable of holding a liquid such as liquid crystal. The liquid crystal injection hole A may be formed along the direction parallel to the signal line connected to one terminal of the thin film transistor.

Figure 21:
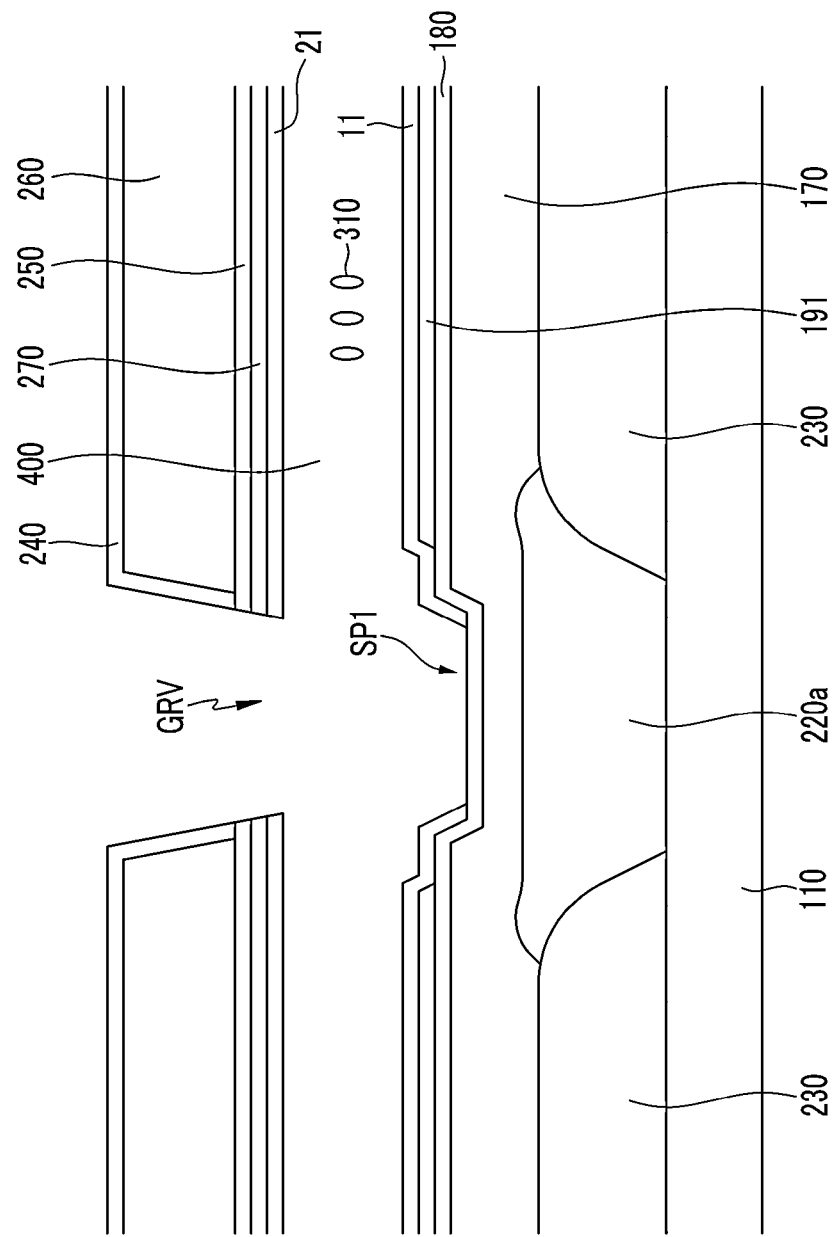

Referring to FIG. 21, an alignment material is injected through the liquid crystal injection hole A shown in FIG. 20 to form alignment layers 11 and 21 on the pixel electrode 191 and the common electrode 270. A baking process is performed after injecting the alignment material through the liquid crystal injection holes A. At this time, alignment layer solids are accumulated in the trench SP shown in FIG. 12 while the drying progresses to the side of the liquid crystal injection hole A. At least part of the solid induced to collect within the trench SP is dragged to the inlet part EP shown in FIG. 13 and is gathered in the storage trench SP1. The width w2 of the storage trench SP1 may be formed to be as wide as or narrower than the inlet part EP, and to lie within its boundaries.

Figure 22:
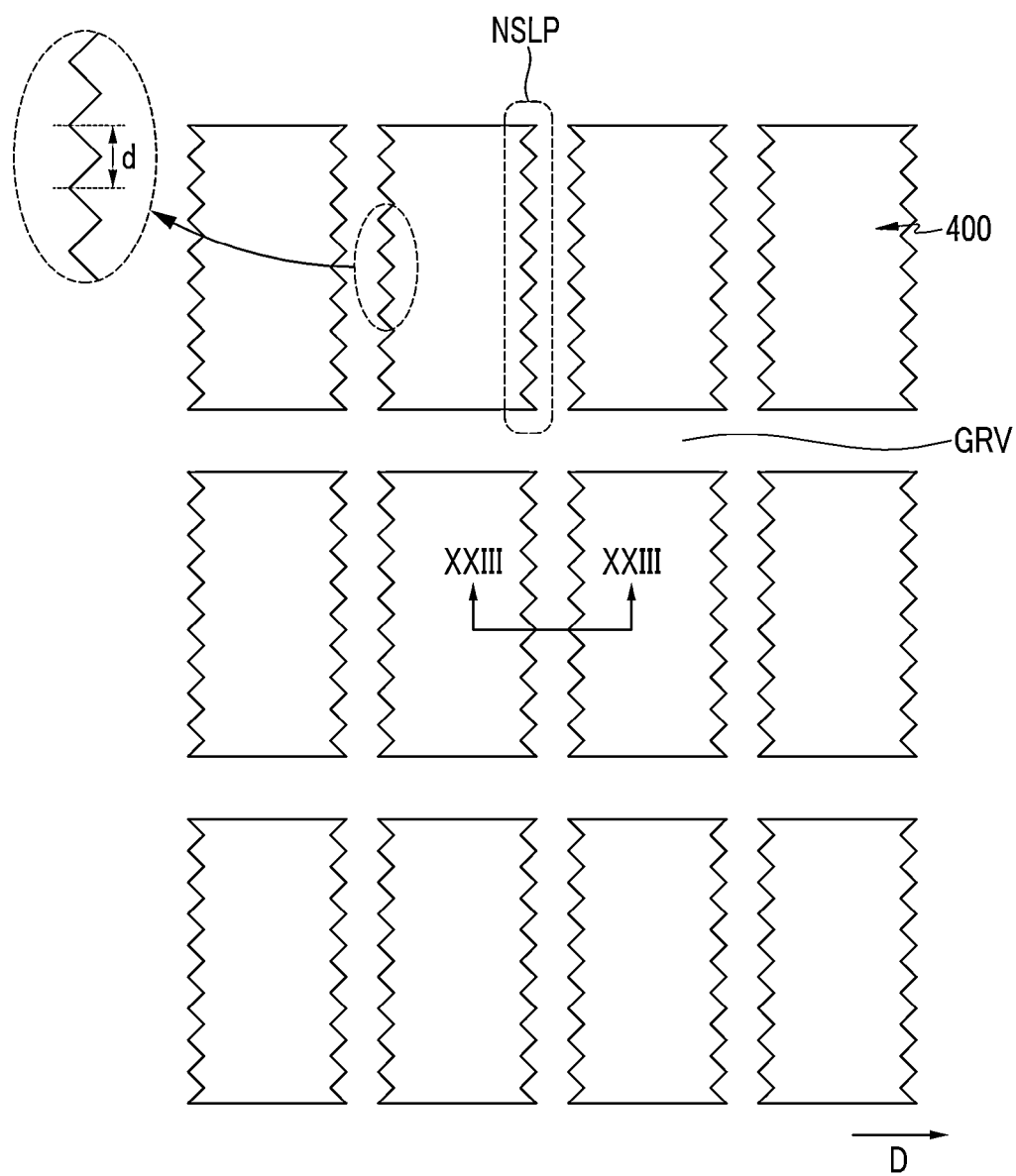
FIG. 22 is a top plan view schematically explaining an arrangement of a trench according to an exemplary embodiment of the present invention.
Figure 23:
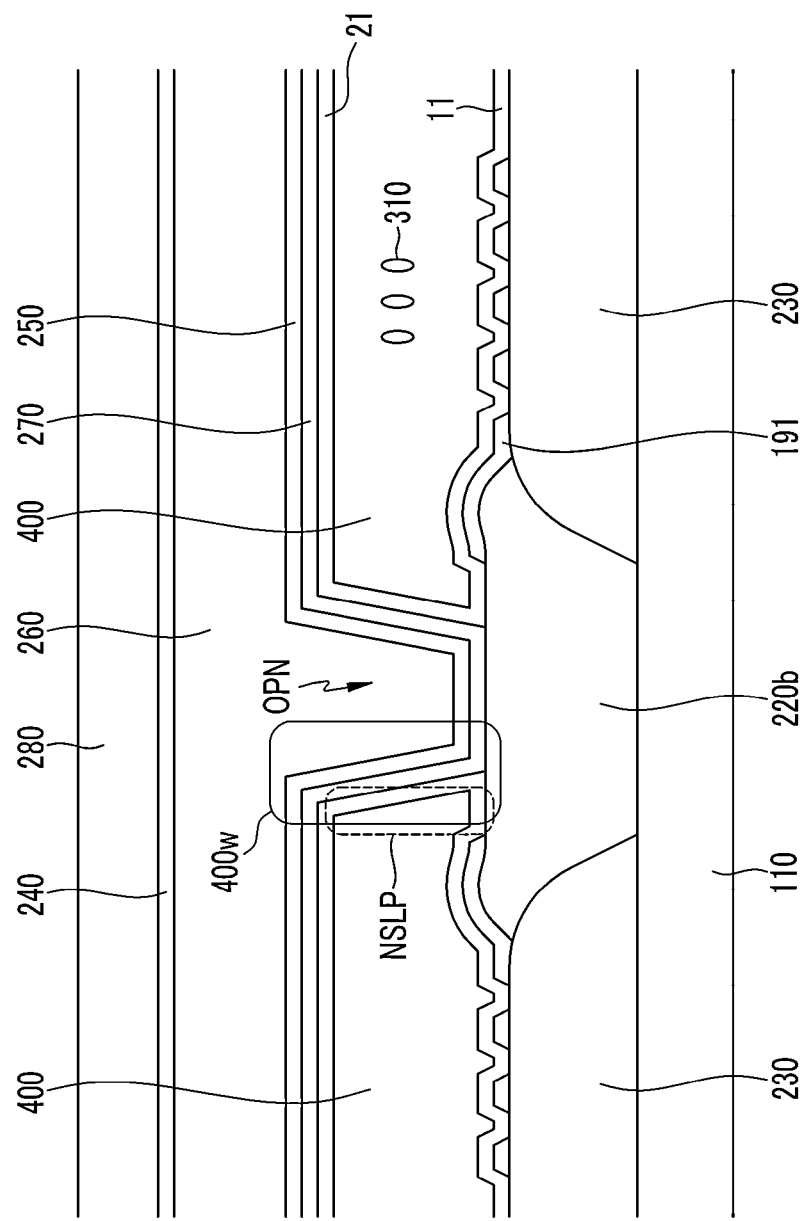
FIG. 23 is a cross-sectional view taken along the line XXIII-XXIII of FIG. 22.

FIG. 22 is a top plan view schematically explaining an arrangement of a trench according to an exemplary embodiment of the present invention. FIG. 23 is a cross-sectional view taken along the line XXIII-XXIII of FIG. 22.

The exemplary embodiment shown in FIG. 22 and FIG. 23 has largely the same configuration as the exemplary embodiment of FIG. 1 to FIG. 5, however the trench SP shown in FIG. 2 and FIG. 3 is not formed. Instead of the trench SP, a non-linear part NSLP having a similar function to the trench SP is formed at the edge of the microcavity 400. Besides the non-linear part NSLP, other elements of the embodiment of FIG. 1 to FIG. 5 may be applied to the present exemplary embodiment, and repetitive explanation of these other elements is omitted for clarity.

Referring to FIG. 22, a plurality of microcavity 400 are formed in a matrix shape (when viewed in plan view), with microcavity 400 that neighbor in the vertical direction being separated by a groove GRV interposed therebetween. Referring to FIG. 23, microcavity 400 adjacent in the horizontal direction are divided by the open part OPN, and the common electrode 270, the overcoat 250, and the supporting member 260 covering the open part OPN thereby forming a side wall 400w of the microcavity 400.

These edge side walls are walls connecting the upper and lower surfaces of the cavity 400, and are shown as the angled sides shown in the center portion of FIG. 23. The non-linear parts NSLP are patterns etched into the surface of the edge side walls.

FIG. 23 shows the location of the non-linear part NSLP in the microcavity 400. As shown in FIG. 22 the non-linear part NSLP can be a zigzag pattern etched into the edge side walls, so that the side walls have the zigzag profile shown. A pitch d of the repetition shape of the non-linear part NSLP is less than the cell gap of the liquid crystal layer.

Like the present exemplary embodiment, if the non-linear part NSLP is formed in the edges of the microcavity 400, the agglomeration of the solid of the aligning agent is decreased at the liquid crystal injection hole A after injecting and drying the aligning agent, so that light leakage and other deleterious effects are minimized. If the pitch d of the non-linear part NSLP is less than the cell gap of the liquid crystal layer, the capillary force of the non-linear part NSLP structure is higher than the capillary force of the microcavity 400 such that the remaining solid may be induced to the non-linear part NSLP. Like this, the remaining solid is spread to the non-linear part NSLP thereby preventing the agglomeration of the solid in a visible area.

The non-linear part NSLP of the microcavity 400 is positioned at a portion overlapping the light blocking member 220, such that aligning agent solids accumulate over a part of the display that is unseen by the viewer. Also, the solid may appropriately filled the protrusions and depressions of the non-linear part NSLP to such a degree that the edge side wall of the microcavity 400 may be made substantially flat.

Figure 24:
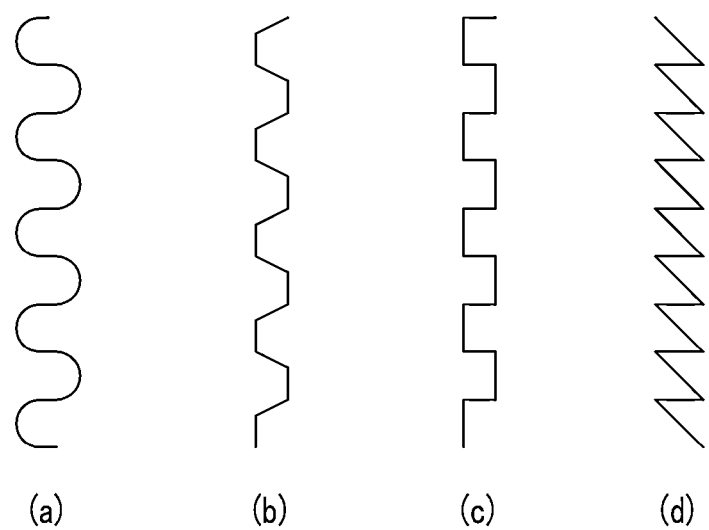
FIG. 24 is a schematic view of a non-linear part of a microcavity according to an exemplary embodiment of the present invention.

Referring to FIG. 24, the non-linear part NSLP of the microcavity 400 according to the present exemplary embodiment is not limited to the zigzag shape of FIG. 22, and may instead be formed to have a circular, trapezoidal, rectangular, or triangular zigzag profile, as shown. Any other profile is also contemplated, so long as it results in accumulation of aligning agent solids therein.

FIG. 25 to FIG. 31 are cross-sectional views and top plane views of a manufacturing method of a liquid crystal display according to another exemplary embodiment of the present invention.

Figure 25:
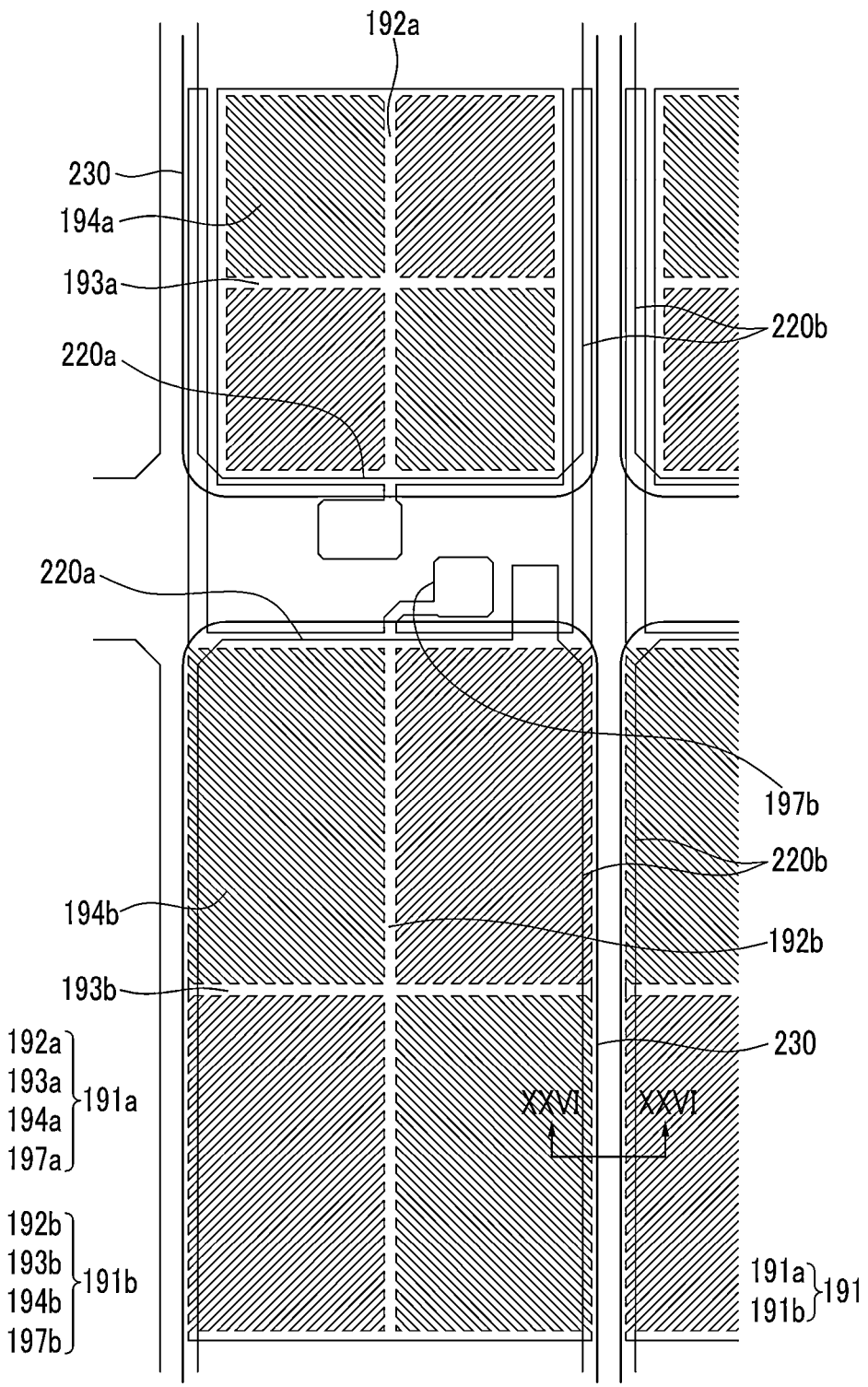
FIG. 25 to FIG. 31 are cross-sectional views and top plane views of a manufacturing method of a liquid crystal display according to another exemplary embodiment of the present invention.
Figure 26:
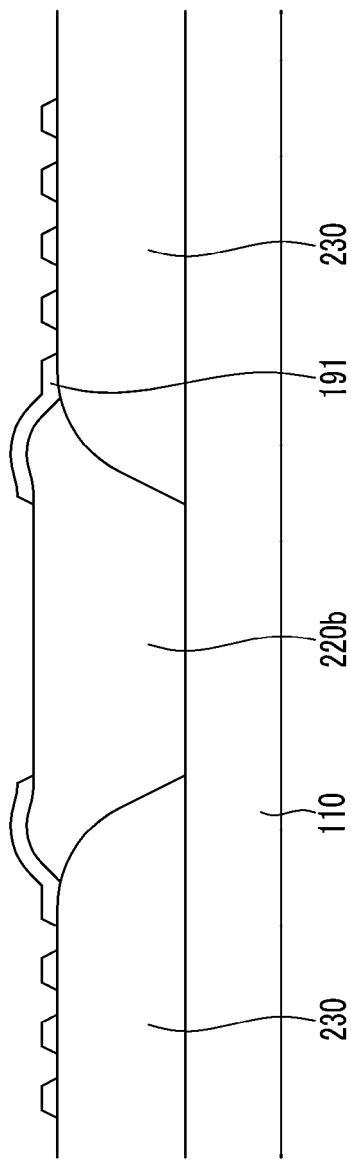

Referring to FIG. 25 and FIG. 26, thin film transistors Qa, Qb, and Qc (shown in FIG. 1) are formed on a substrate 110 made of transparent glass or plastic. An organic layer 230 corresponding to a pixel area is formed on the thin film transistors Qa, Qb, and Qc, and a light blocking member 220, including a transverse light blocking member 220a and a longitudinal light blocking member 220b, is formed between the neighboring portions of the organic layer 230. As shown in FIG. 26, the longitudinal light blocking member 220b overlaps edges of the neighboring organic layer 230.

After forming a pixel electrode material on the organic layer 230, the pixel electrode material is patterned to form a pixel electrode 191 positioned at the pixel area.

Figure 27:
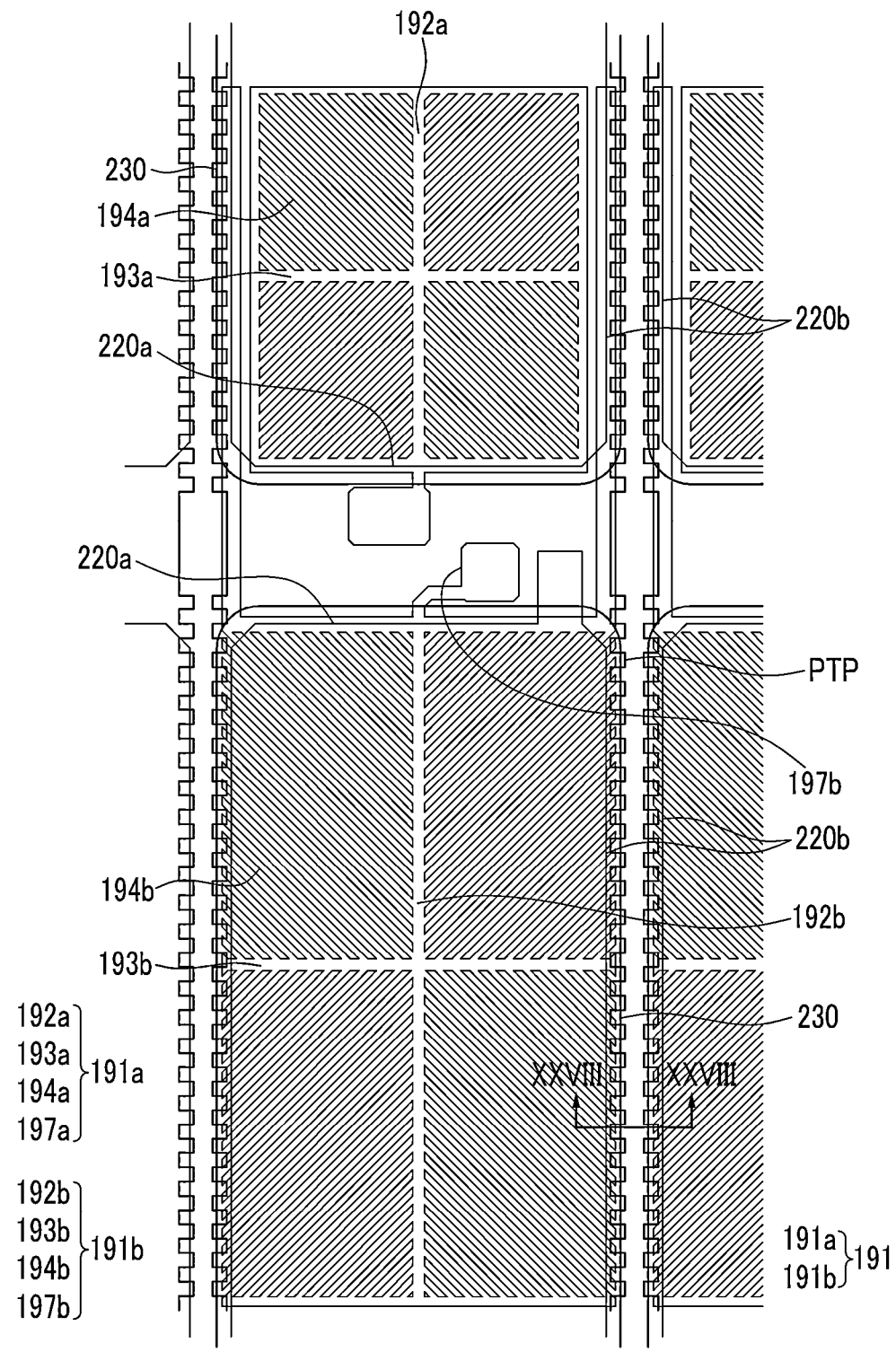
Figure 28:
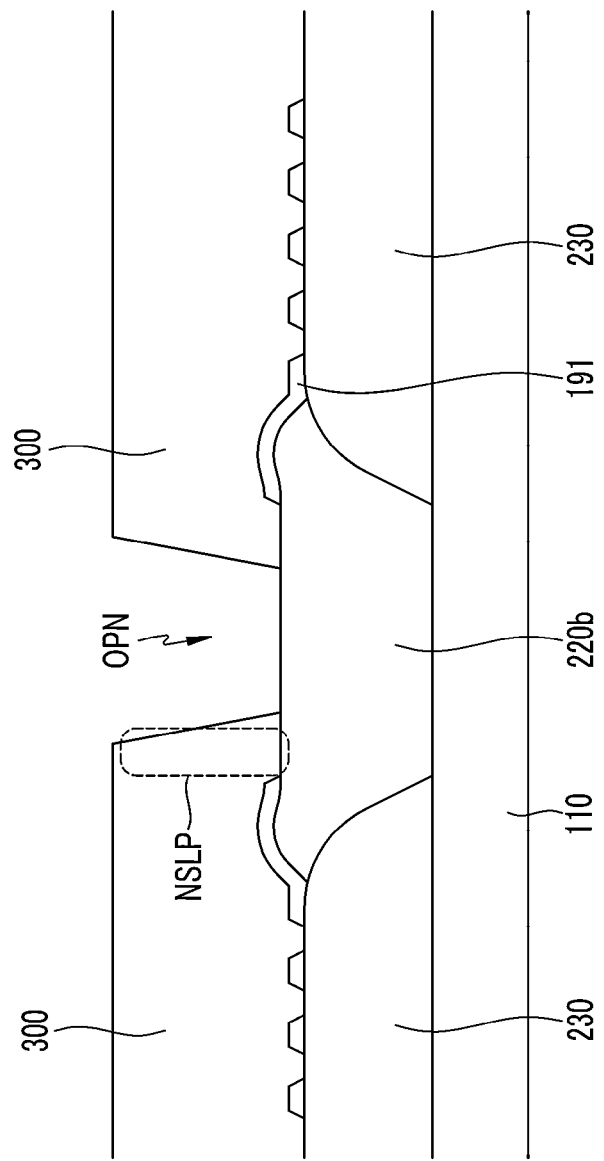

Referring to FIG. 27 and FIG. 28, a sacrificial layer 300 including silicon oxycarbide (SiOC) or a photoresist is formed on the pixel electrode 191. The sacrificial layer 300 may be formed of an organic material as well as silicon oxycarbide (SiOC) or photoresist.

The sacrificial layer 300 is patterned to form an open part OPN on the longitudinal light blocking member 200b. The open part OPN may divide the portions of the microcavity 400 that neighbor each other in the horizontal direction. At this time, as shown in FIG. 27, a non-linear part NSLP including a protrusion and depression part PTP is formed in the exposed edge of the sacrificial layer 300. As described above, it is preferable for a pitch of the protrusion and depression part PTP to be less than the cell gap of the liquid crystal layer.

Figure 29:
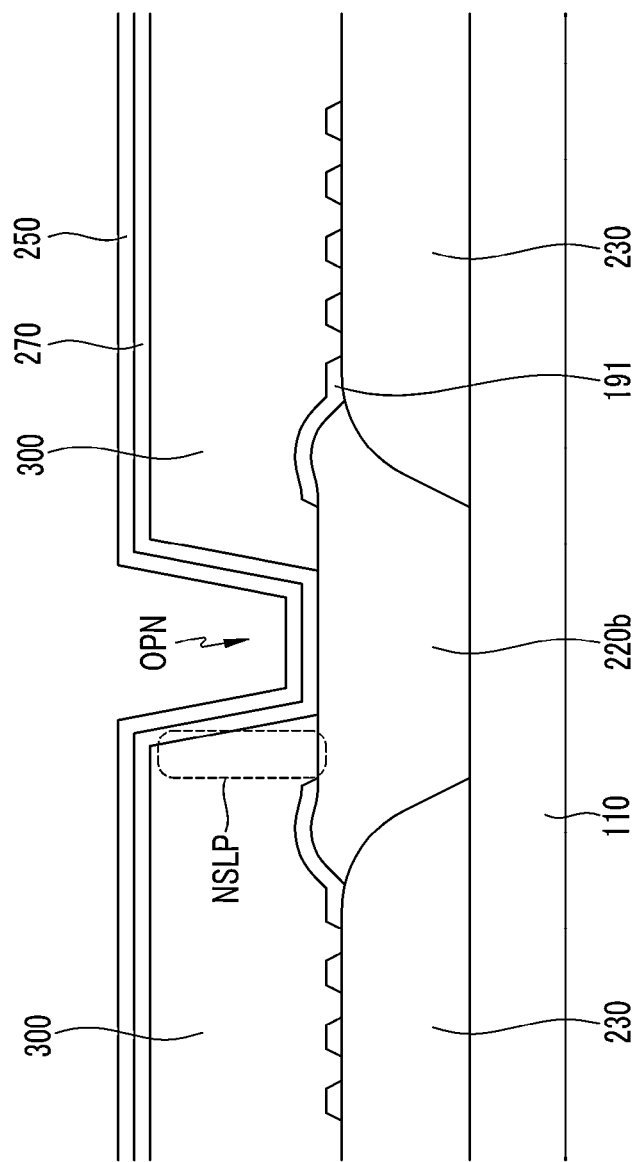

Referring to FIG. 29, the common electrode 270 and the first overcoat 250 are sequentially formed on the sacrificial layer 300. The common electrode 270 may be made of a transparent conductor such as ITO or IZO, and the first overcoat 250 may be made of silicon nitride ($SiN_x$) or silicon oxide ($SiO_2$). The common electrode 260 and the first overcoat 250 may cover the open part OPN between the microcavity 400.

Figure 30:
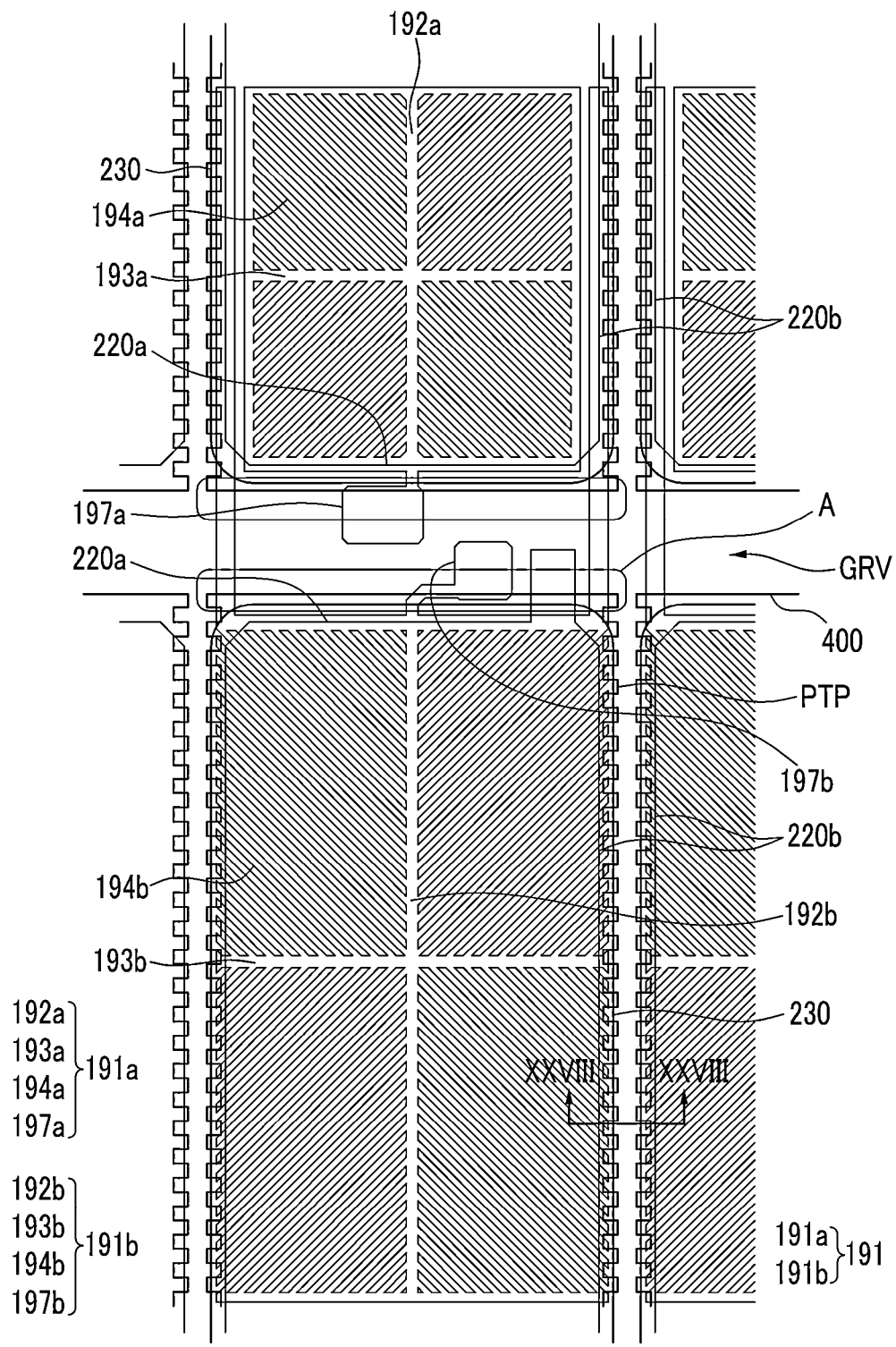
Figure 31:
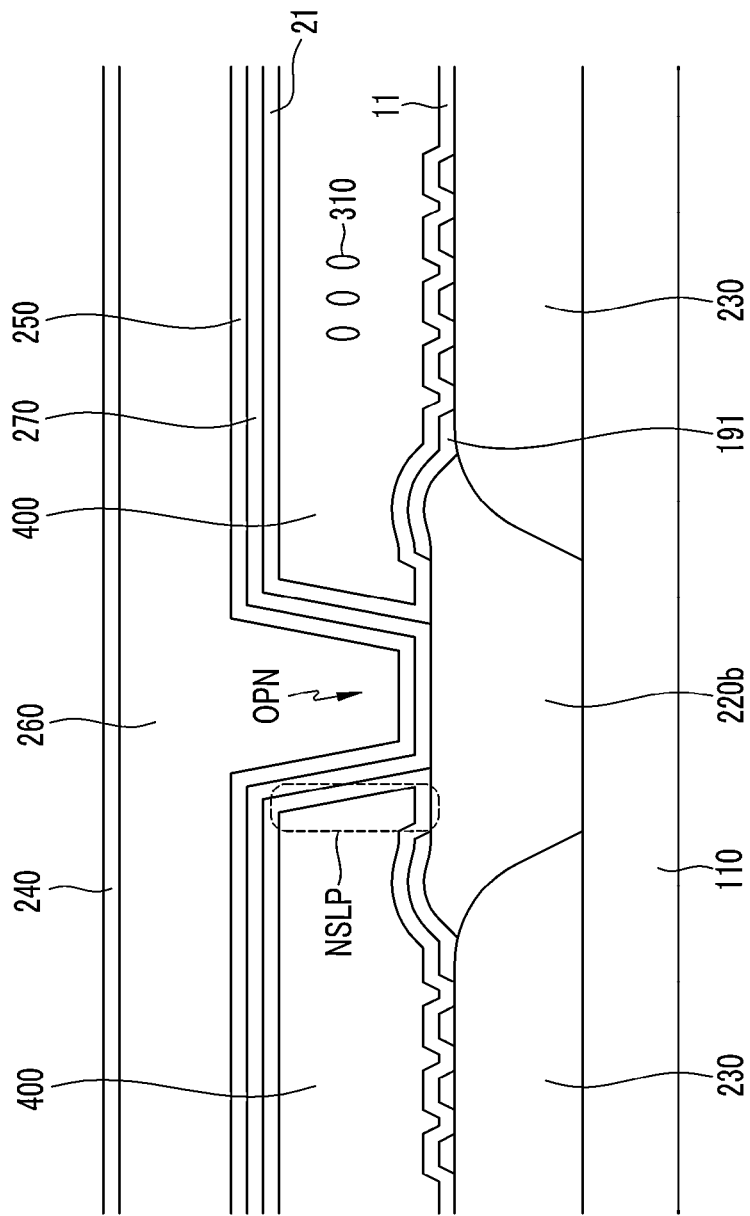

Referring to FIG. 30 and FIG. 31, a supporting member 260 having a groove GRV is formed on the overcoat 250, and then a second overcoat 240 is formed on the supporting member 260. The following process is performed similarly to the previously described exemplary embodiment. In this manner, the passivation layer 240, the overcoat 250, and the common electrode 270 positioned at the portion corresponding to the groove GRV are sequentially patterned to expose the sacrificial layer 300, and the sacrificial layer 300 is removed by an ashing process or wet etching method. If the sacrificial layer 300 is removed, the microcavity 400 having the liquid crystal injection hole A is formed at this position.

If the sacrificial layer 300 is removed, as shown in FIG. 31, the common electrode 270, the overcoat 250, and the supporting member 260 cover the open part OPN such that an edge side wall of the microcavity 400 is formed as a partition. The portion corresponding to the edge side wall of the microcavity 400 has the same shape as the non-linear part NSLP of the sacrificial layer 300, such that the non-linear part NSLP including the protrusion and depression part PTP is formed in the edge of the microcavity 400.

Referring to FIG. 31, an alignment material is injected through the liquid crystal injection hole A shown in FIG. 30 to form alignment layers 11 and 21 on the pixel electrode 191 and the common electrode 270. A baking process is performed after injecting the alignment material through the liquid crystal injection holes A. At this time, the alignment layer is formed, and the remaining solids are induced to accumulate in the non-linear part NSLP of the microcavity 400 while the drying progresses to the side of the liquid crystal injection hole A. Although the solid induced to accumulate on the non-linear part NSLP is maintained, if the protrusion and depression part PTP is formed over the longitudinal light blocking member 220b, this portion is a region that is not seen by the viewer, such that deleterious effects like light leakage may be reduced or prevented.

Next, a liquid crystal material including the liquid crystal molecules 310 are injected through the liquid crystal injection hole A, and a capping layer (not shown) covering the upper surface and the side wall of the supporting member 260 is formed to cove the liquid crystal injection hole A.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims. The various aspects of these different embodiments can be combined in any manner.

<Description of Symbols>

| 220 | light blocking member | 230 | organic layer |
|---|---|---|---|
| 191 | pixel electrode | 300 | sacrificial layer |
| 250 | overcoat | 260 | supporting member |
| 270 | common electrode | 400 | microcavity layer |
| SP | trench | NSLP | non-linear part |

What is claimed is:

1. A display panel, comprising:
a substrate;
a pixel electrode disposed on the substrate;
a supporting member facing the pixel electrode; and
a liquid crystal layer disposed in a plurality of enclosed microcavities between the pixel electrode and the supporting member,
wherein at least one microcavity of the plurality of microcavities has a trench disposed proximate to an edge thereof, the trench being disposed along a signal line connected to a thin film transistor, the trench further having a portion configured to accumulate an aligning agent therein, the portion at least partially overlapping the signal line, and
wherein the microcavities are separated from one another.

2. The display panel of claim 1, further comprising a first black matrix and a second black matrix each disposed on the substrate,
wherein the at least one microcavity has an upper surface proximate to the supporting member and a lower surface opposite to the upper surface,
wherein the at least one microcavity has a first end disposed over the first black matrix, and a second end opposite the first end and disposed over the second black matrix,
wherein the lower surface of the at least one microcavity has first and second channels disposed therein, the first channel being disposed over the first black matrix, and the second channel being disposed over the second black matrix, and
wherein the first channel is disposed proximate to the first end, and the second channel is disposed proximate to the second end.

3. The display panel of claim 1:
wherein the microcavity extends lengthwise along a major axis, and has a minor axis oriented perpendicular to the major axis; and
wherein the first black matrix and the second black matrix are each oriented parallel to the major axis.

4. The display panel of claim 2:
wherein the at least one microcavity extends lengthwise along a major axis, and has a minor axis oriented perpendicular to the major axis; and
wherein the first black matrix and the second black matrix are each oriented parallel to the minor axis.

5. The display panel of claim 1, wherein the width of the trench is less than or equal to a height of the at least one microcavity.

6. The display panel of claim 2:
wherein the pixel electrode is a first pixel electrode, the at least one microcavity is a first microcavity, and the supporting member is a first supporting member;
wherein the first microcavity is disposed between the first pixel electrode and the first supporting member;
wherein the display panel further comprises:
a second pixel electrode disposed on the substrate proximate to the first pixel electrode;

a second supporting member disposed on the substrate over the second pixel electrode;

a second microcavity disposed between the second pixel electrode and the second supporting member, the second microcavity having a top surface proximate to the second supporting member and a bottom surface opposite to the top surface; and a third black matrix and a fourth black matrix each disposed on the substrate and under the second microcavity;

wherein the second microcavity has a one end positioned over the third black matrix, and another end opposite the one end and positioned over the fourth black matrix; and wherein the bottom surface of the second microcavity has third and fourth channels disposed therein, the third channel positioned over the third black matrix, and the fourth channel positioned over the fourth black matrix.

7. A method of manufacturing a display panel, the method comprising:

forming a pixel electrode on a substrate;

forming a sacrificial layer on the pixel electrode;

forming a supporting member on the sacrificial layer; and removing the sacrificial layer to form a plurality of enclosed microcavities;

wherein at least one microcavity of the plurality of microcavities has a trench, the trench having a portion configured to accumulate an aligning agent therein once the aligning agent is injected into the at least one microcavity, the portion at least partially overlapping a signal line, and wherein the microcavities are separated from one another.

8. The method of claim 7, further comprising forming a feature proximate to at least one end of the microcavity;

wherein the forming a black matrix further comprises forming a first black matrix and a second black matrix on the substrate;

wherein the at least one microcavity has an upper surface proximate to the supporting member and a lower surface opposite to the upper surface;

wherein the at least one microcavity has a first end disposed over the first black matrix, and a second end opposite the first end and disposed over the second black matrix; and wherein the forming a feature further comprises forming at least one channel in the lower surface of the at least one microcavity, the at least one channel disposed over at least one of the first black matrix and the second black matrix.

9. The method of claim 8, wherein the forming at least one channel further comprises forming first and second channels in the lower surface of the at least one microcavity, the first channel disposed over the first black matrix, and the second channel disposed over the second black matrix.

10. The method of claim 7:

wherein the microcavity has an upper surface proximate to the supporting member, a lower surface opposite to the upper surface, and at least one side surface extending between the upper and lower surfaces; and wherein the method further comprises patterning a plurality of depressions upon the at least one side surface.

11. The method of claim 10, wherein the plurality of depressions comprises a repeating pattern of depressions extending along a length of its respective side surface, each depression extending from the lower surface to the upper surface.

* * * * *